(12) United States Patent
Uenaka et al.

(10) Patent No.: US 7,480,457 B2
(45) Date of Patent: Jan. 20, 2009

(54) PHOTOGRAPHING APPARATUS

(75) Inventors: Yukio Uenaka, Tokyo (JP); Takahiro Ogawa, Saitama (JP)

(73) Assignee: Hoya Corporation, Tokyo (JP)

( * ) Notice: Subject to any disclaimer, the term of this patent is extended or adjusted under 35 U.S.C. 154(b) by 595 days.

(21) Appl. No.: 11/157,806

(22) Filed: Jun. 22, 2005

(65) Prior Publication Data
US 2005/0286887 A1 Dec. 29, 2005

(30) Foreign Application Priority Data
Jun. 23, 2004 (JP) .......................... P2004-185207
Jun. 23, 2004 (JP) .......................... P2004-185371

(51) Int. Cl.
*G03B 41/00* (2006.01)
(52) U.S. Cl. .................................... 396/322
(58) Field of Classification Search .................. 396/20, 396/322–323, 332–336, 419; 348/208.11
See application file for complete search history.

(56) References Cited

U.S. PATENT DOCUMENTS

| 6,205,259 B1* | 3/2001 | Komiya et al. .............. 382/284 |
| 6,292,593 B1* | 9/2001 | Nako et al. .................. 382/284 |
| 6,556,783 B1* | 4/2003 | Gelphman .................... 396/20 |
| 6,639,625 B1* | 10/2003 | Ishida et al. .............. 348/218.1 |
| 2005/0190267 A1 | 9/2005 | Uenaka et al. |
| 2005/0190268 A1 | 9/2005 | Uenaka |
| 2006/0251410 A1* | 11/2006 | Trutna, Jr. .................... 396/55 |

OTHER PUBLICATIONS

U.S. Appl. No. 11/088,778 to Uenaka, filed Mar. 25, 2005.
U.S. Appl. No. 11/167,107 to Ogawa, filed Jul. 28, 2005.

* cited by examiner

*Primary Examiner*—Christophe Mahoney
(74) *Attorney, Agent, or Firm*—Greenblum & Bernstein, P.L.C.

(57) ABSTRACT

A photographing apparatus comprises a movable unit, a fixed unit, and a control unit. The movable unit has an imaging device, and can be moved in a first direction. The first direction is perpendicular to an optical axis of a photographing optical system of the photographing apparatus. The fixed unit slidably supports the movable unit in the first direction. The control apparatus controls moving the movable unit to two or more movement-positions in the movable unit's movement range, and obtains a wide-angle image signal which is a combination of the two or more image signals being imaged at two or more movement-positions of the movable unit.

14 Claims, 23 Drawing Sheets

PHOTOGRAPHING APPARATUS

BACKGROUND OF THE INVENTION

1. Field of the Invention

The present invention relates to a photographing apparatus, and in particular to an apparatus for obtaining a wide-angle image in comparison with a standard image obtained by using the focal distance of the photographing optical system.

2. Description of the Related Art

A photographing apparatus for obtaining a wide-angle image in comparison with a standard image obtained by using the focal distance of the photographing optical system, by moving the imaging field, by imaging at some positions, and by combining some images which are imaged at some positions, is proposed.

U.S. Pat. No. 6,639,625, Ishida et al. discloses a photographing apparatus whose imaging device and photographing optical system are movable.

However, in this photographing apparatus, a direction of the optical axis is changed as the imaging device is moved, so that a combined image which is combined from a plurality of images, has a distortion at the connecting area. Further, because the photographing optical system is movable, the photographing apparatus is enlarged.

SUMMARY OF THE INVENTION

Therefore, an object of the present invention is to provide a wide-angle photographing apparatus which obtains the wide-angle image without distortion at the connecting area, and without enlarging the body.

According to the present invention, a photographing apparatus comprises a movable unit, a fixed unit, and a control unit.

The movable unit has an imaging device, and can be moved in a first direction. The first direction is perpendicular to an optical axis of a photographing optical system of the photographing apparatus.

The fixed unit slidably supports the movable unit in the first direction.

The control apparatus controls moving the movable unit to two or more movement-positions in the movable unit's movement range, and obtains a wide-angle image signal which is a combination of the two or more image signals being imaged at the two or more movement-positions of the movable unit.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
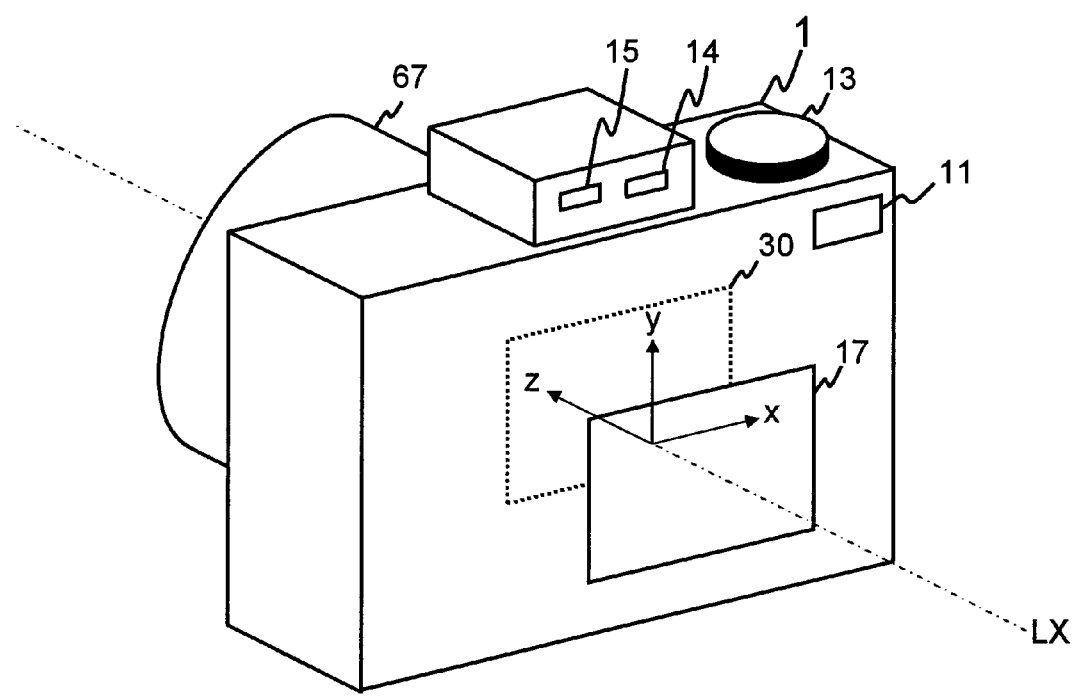
FIG. 1 is a perspective view of a photographing apparatus of the first embodiment viewed from the back side of the photographing apparatus.

The present invention is described below with reference to the embodiments shown in the drawings. In the first and second embodiments, the photographing device 1 is a digital camera. The photographing device 1 has an optical axis LX.

Figure 2:
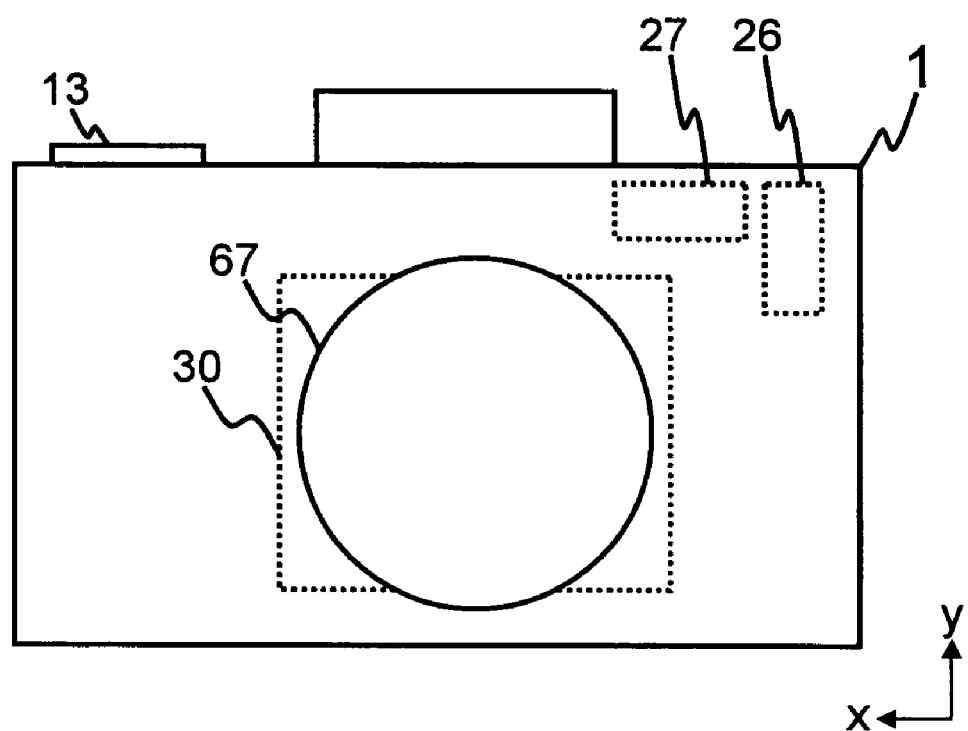
FIG. 2 is a front view of the photographing apparatus.
Figure 3:
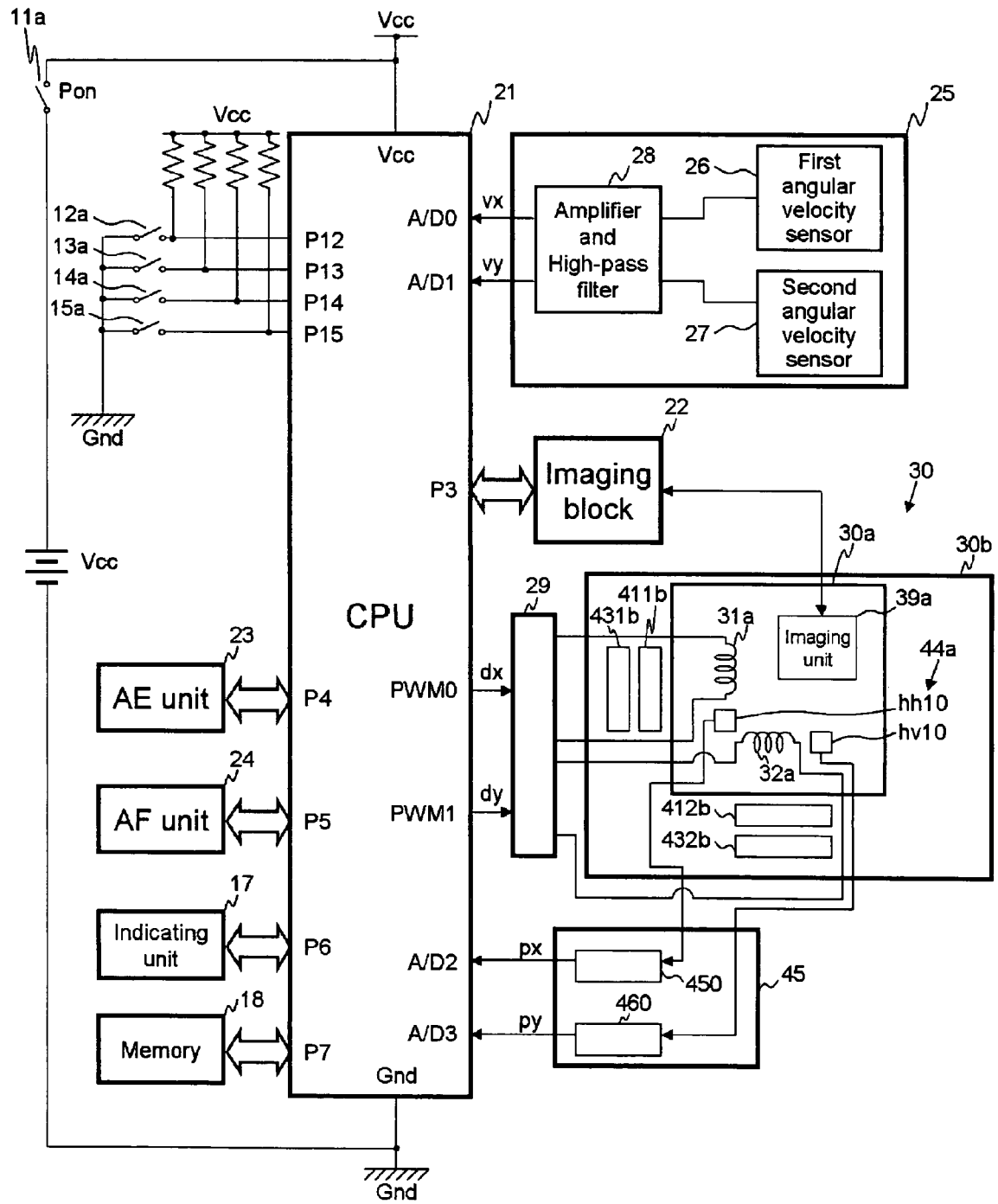
FIG. 3 is a circuit construction diagram of the photographing apparatus in the first embodiment.
Figure 4:
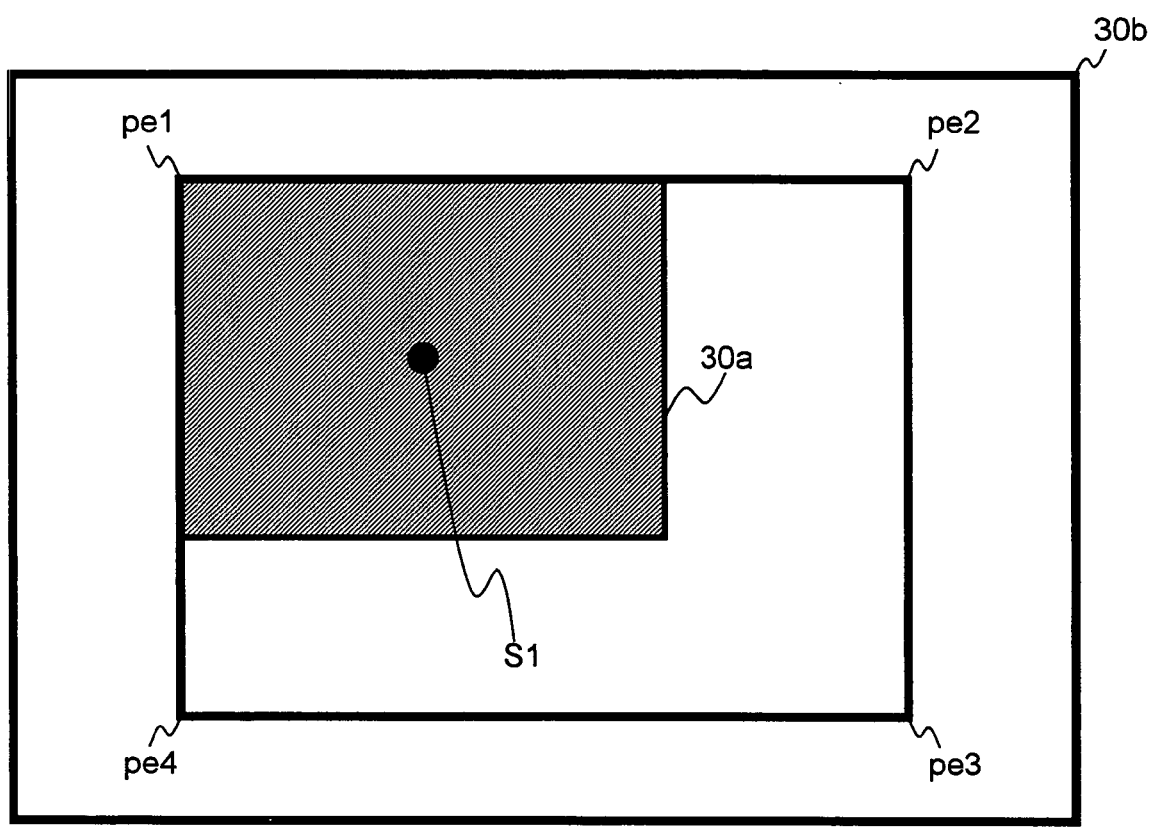
FIG. 4 is a construction diagram which simply shows the position relation between the movable unit and the fixed unit, when the movable unit is in the first position.
Figure 4:
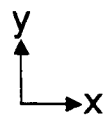
Figure 5:
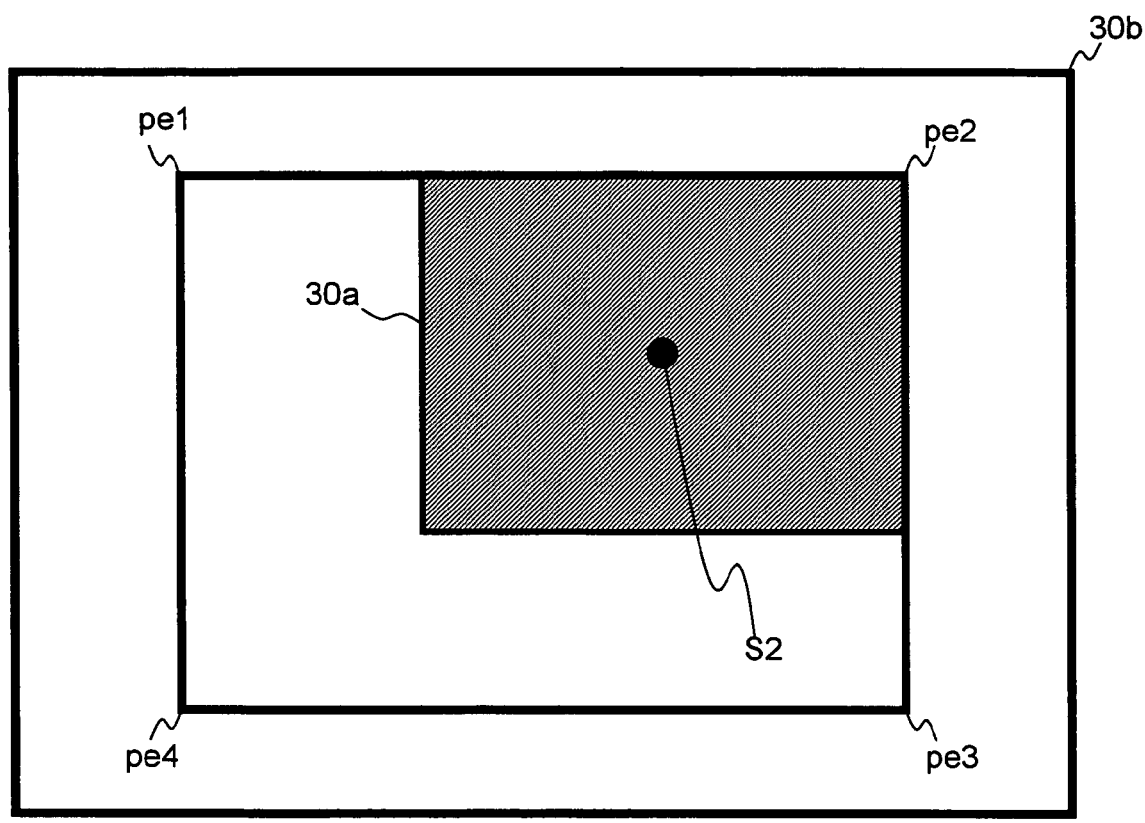
FIG. 5 is a construction diagram which simply shows the position relation between the movable unit and the fixed unit, when the movable unit is in the second position.
Figure 5:
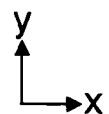
Figure 6:
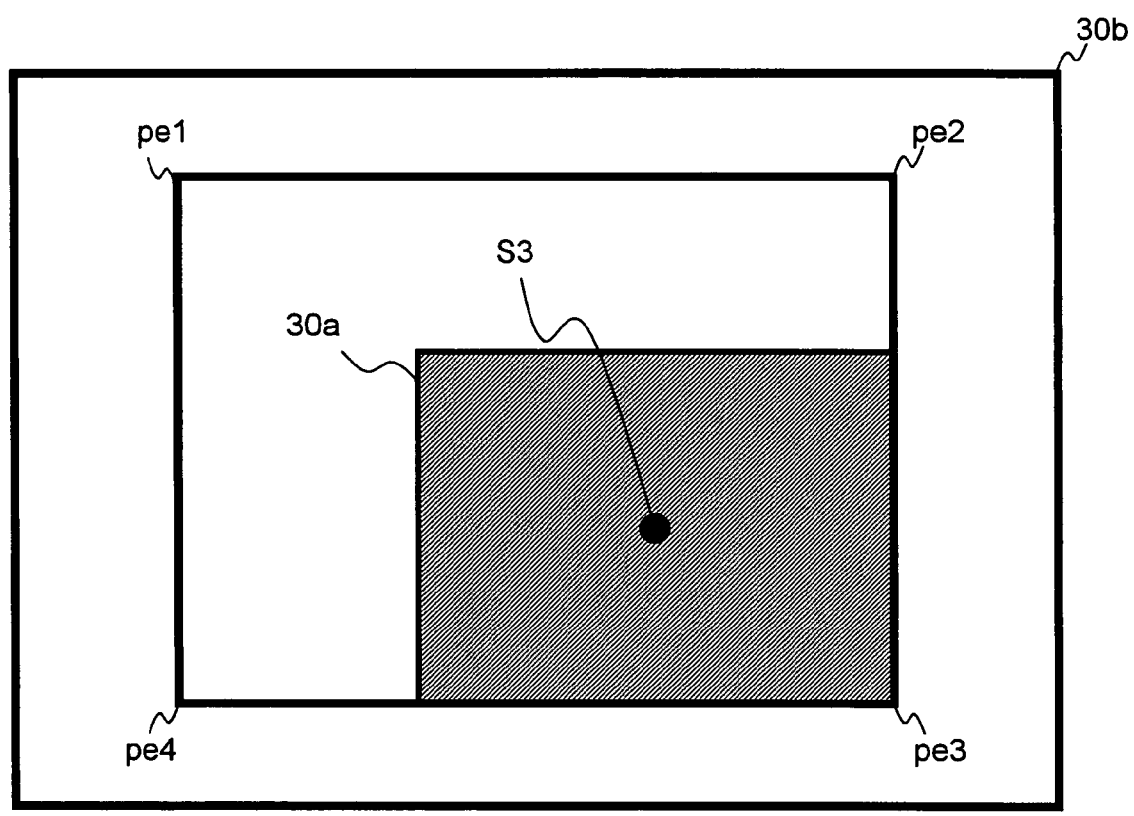
FIG. 6 is a construction diagram which simply shows the position relation between the movable unit and the fixed unit, when the movable unit is in the third position.
Figure 7:
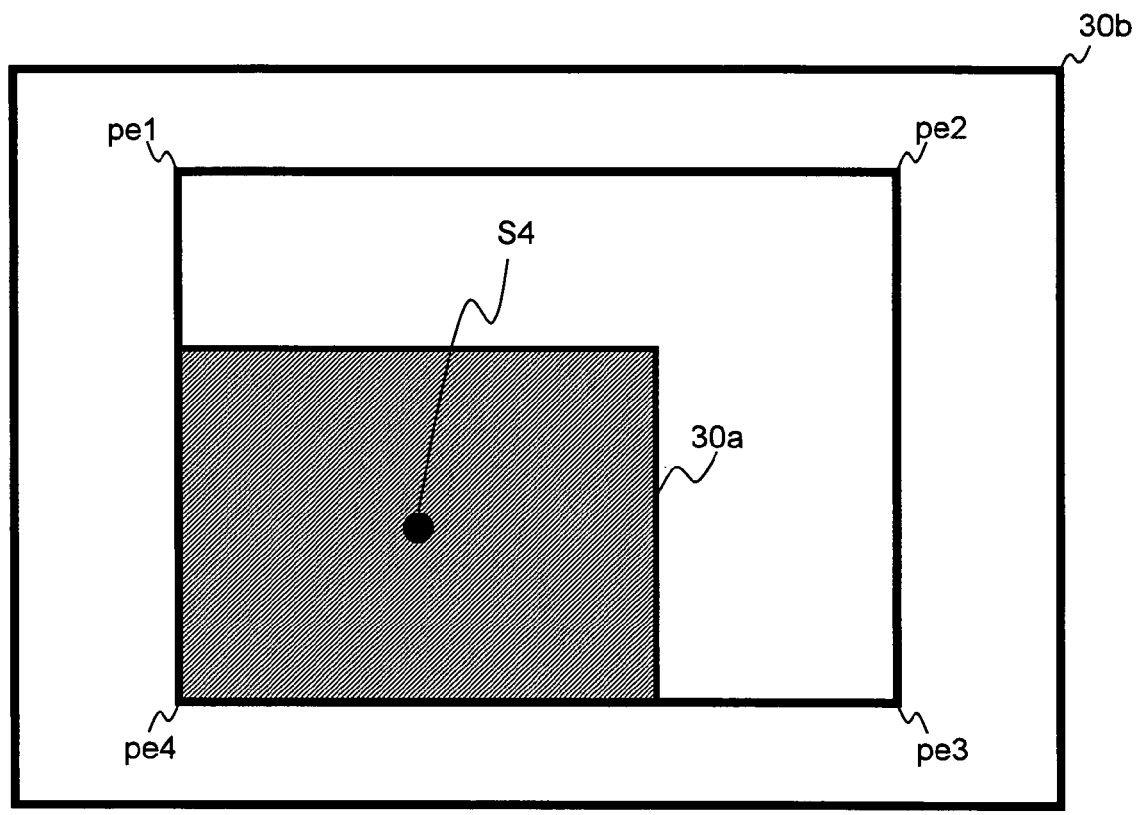
FIG. 7 is a construction diagram which simply shows the position relation between the movable unit and the fixed unit, when the movable unit is in the fourth position.

FIGS. 1 to 3 show the construction of the photographing apparatus 1 in the first embodiment. FIGS. 4 to 7 are construction diagrams which show the location relation between the movable unit 30a and the fixed unit 30b. FIGS. 8 to 11 are construction diagrams which show the location relation between the imaging field IF of the imaging device 39a1 and the imaging field's movement range R1.

In order to explain the direction in this embodiment, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

Figure 13:
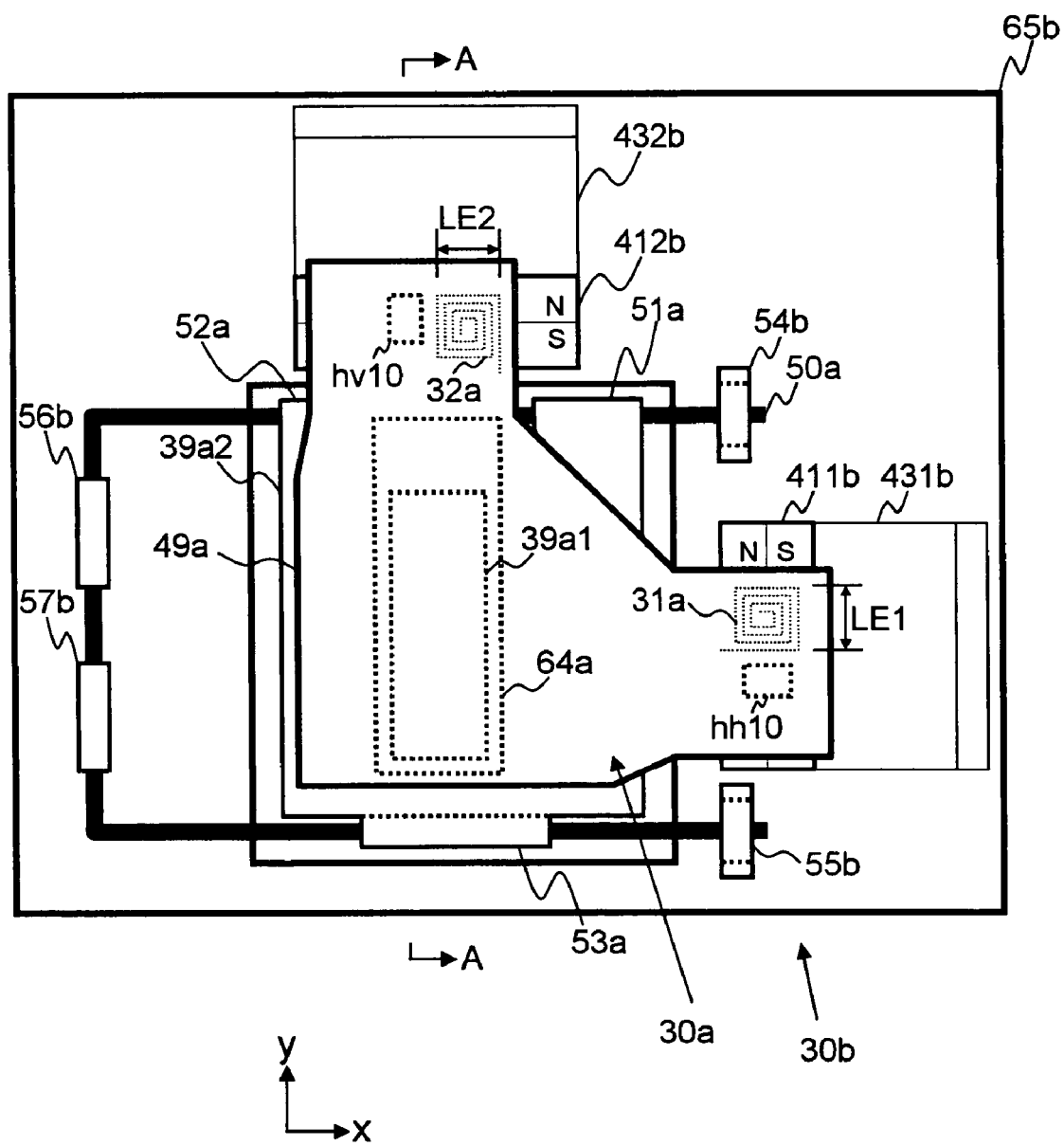
FIG. 13 is a figure showing the construction of the anti-shake and wide-angle imaging unit.
Figure 14:
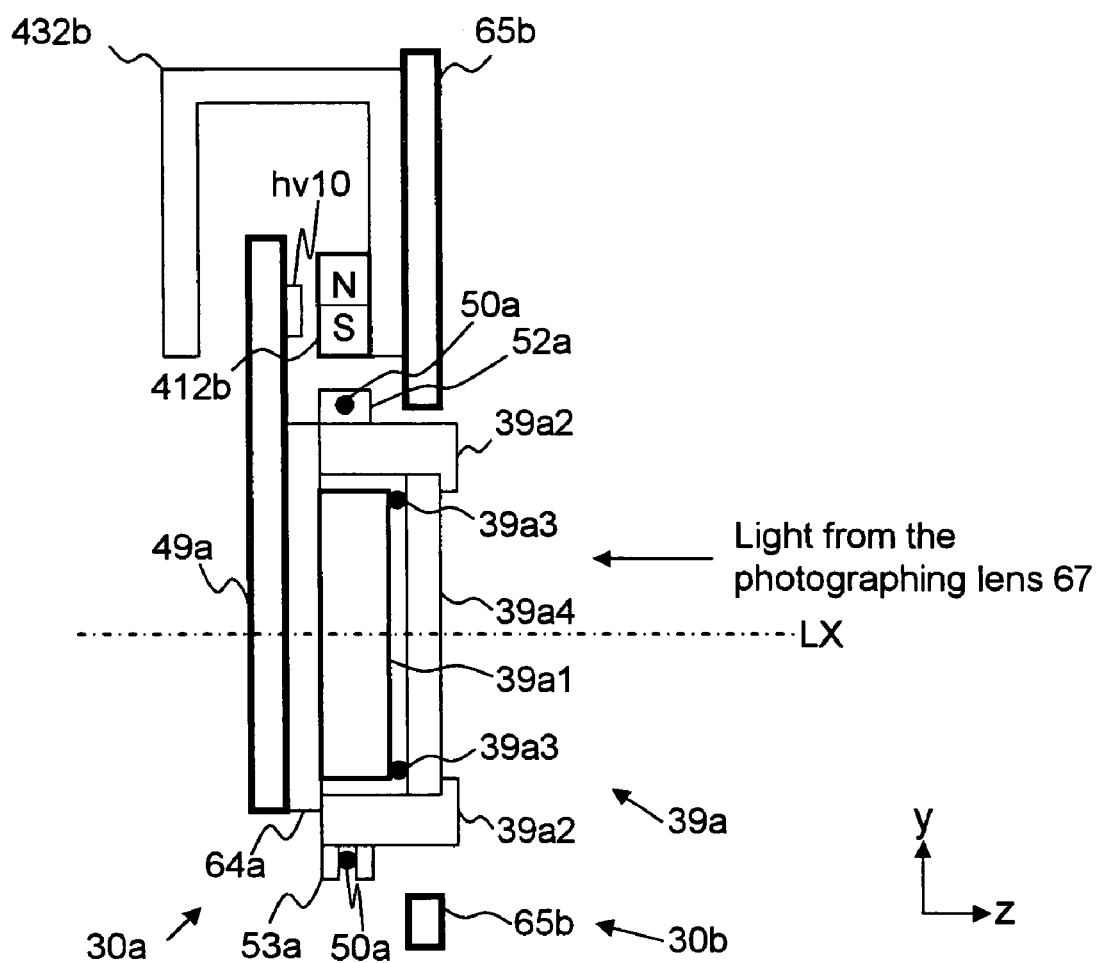
FIG. 14 is a view along line A-A of FIG. 13.

FIG. 14 shows a construction diagram of the section along line A-A of FIG. 13.

The imaging part of the photographing apparatus 1 comprises a Pon button 11, a Pon switch 11a, a photometric switch 12a, a release button 13, a release switch 13a, an indicating unit 17 such as an LCD monitor etc., a memory 18, a CPU 21, an imaging block 22, an AE (automatic exposure) unit 23, an AF (automatic focusing) unit 24, an imaging unit 39a in the anti-shake and wide-angle imaging unit 30, and a photographing optical system 67 (see FIGS. 1, 2, and 3).

Whether the Pon switch 11a is in the on state or the off state, is determined by a state of the Pon button 11, so that the on/off states of the photographing apparatus 1 are changed corresponding to the on/off states of the Pon switch 11a.

The photographic subject image is captured in the imaging field IF of the imaging device 39a1 as an optical image through the photographing optical system 67. The imaging device 39a1 converts the optical image to electric signals by photoelectric conversion. After accumulation over a predetermined time length by the imaging device 39a1, the electric signals, which are converted from the optical image and which are based on the read out charges, are converted to image signals that can be indicated on the indicating unit 17 and stored in the memory 18, through the imaging block 22 and a DSP (Digital Signal Processor) of the CPU 21 etc.

The indicating unit 17 indicates the image signal as the photographic subject image. The photographic subject image can be optically observed by the optical finder (not depicted). The indicating unit 17 is connected with the port P6 of the CPU 21.

The memory 18 stores the image signal. The memory 18 is connected with the port P7 of the CPU 21.

There are two types indicating operation by the indicating unit 17 in the first embodiment. One of the two types is a first indication of the through image, where the photographic subject image based on the image signal is indicated continuously in a first predetermined time interval. The first indication of the through image is performed when the release switch 13a is in the off state so that the image signal is not stored in the memory 18.

The other of the two types of indicating operation is an indication of a still image obtained by the photographic operation. In the indication of the still image, the photographic subject image (the still image) based on the image signal is indicated. The indication of the still image is performed when the release switch 13a is set to the on state so that the image signal is stored in the memory 18.

There are two ways of indicating of the still image in the first embodiment. One of the two ways is a second indication of a normal still image, so that the other of the two ways is a third indication of a wide-angle still image.

In the second indication of the normal still image, the normal photographic subject image based on the normal image signal which is obtained by imaging when the movable unit 30a is fixed at a position, is indicated on the indicating field of the indicating unit 17, and the normal image signal is stored in the memory 18. The second indication of the normal still image is performed when the wide-angle imaging switch 15a is in the off state.

In the third indication of the wide-angle still image, the wide photographic subject image PicW (the wide-angle image PicW) based on the wide-angle image signal PsW is indicated on the indicating field of the indicating unit 17, and the wide-angle image signal PsW is stored in the memory 18. The third indication of the wide-angle still image, is performed when the wide-angle imaging switch 15a is in the on state.

FIG. 3 is a block diagram which shows the circuit construction of the photographing apparatus 1.

The CPU 21 is a control apparatus, which controls each part of the photographing apparatus 1 regarding the imaging operation, and controls each part of the photographing apparatus 1 regarding the anti-shake operation including the control of the moving and position-detecting operation. The anti-shake operation controls the movement of the movable unit 30a and controls detecting the position of the movable unit 30a.

The CPU 21 temporarily stores the value of the parameter IS regarding the anti-shake mode, which is described later.

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The imaging block 22 drives the imaging unit 39a. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the photographing optical system 67 is moved in the optical axis LX direction.

The anti-shaking part of the photographing apparatus 1 comprises an anti-shake button 14, an anti-shake switch 14a, a wide-angle imaging button 15, a wide-angle imaging switch 15a, an indicating unit 17, a memory 18, a CPU 21, an angular velocity detecting unit 25, a driver circuit 29, an anti-shake and wide-angle imaging unit 30, a hall-element signal-processing unit 45, and the photographing optical system 67.

When the anti-shake button 14 is fully pushed by the operator, the anti-shake switch 14a changes to the on state, so that the anti-shake operation is performed (the anti-shake mode) where the angular velocity detecting unit 25 and the anti-shake and wide-angle imaging unit 30 are driven, at every second predetermined time interval, independently of the other operations which include the photometric operation etc. When the anti-shake switch 14a is in the on state, in other words in the anti-shake mode, the parameter IS is set to 1 (IS=1). When the anti-shake switch 14a is not in the on state, in other words in the non anti-shake mode, the parameter IS is set to 0 (IS=0). In this embodiment, the second predetermined time interval is 1 ms.

When the wide-angle imaging button 15 is fully pushed by the operator, the wide-angle imaging switch 15a changes to the on state, and the anti-shake operation is stopped, and the indicating unit 17, the memory 18, the anti-shake and wide-angle imaging unit 30, and the imaging block 22 are driven, and the wide-angle imaging operation is performed (the wide-angle imaging mode).

The various output commands corresponding to the input signals of these switches are controlled by the CPU 21.

The information regarding whether the photometric switch 12a is in the on state or in the off state, is input to port P12 of the CPU 21 as a 1-bit digital signal. The information regarding whether the release switch 13a is in the on state or in the off state, is input to port P13 of the CPU 21 as a 1-bit digital signal. The information regarding whether the anti-shake switch 14a is in the on state or in the off state, is input to port P14 of the CPU 21 as a 1-bit digital signal. The information regarding whether the wide-angle imaging switch 15a is in the on state or in the off state, is input to port P15 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

Next, the details of the input and output relationship with the CPU 21 for the angular velocity unit 25, the driver circuit 29, the anti-shake and wide-angle imaging unit 30, and the hall-element signal-processing unit 45 are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every second predetermined time interval (1 ms). The second angular velocity sensor 27 detects the velocity-component in the second direction y of the angular velocity of the photographing apparatus 1, at every second predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1 to digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates the position S of the imaging unit 39a (the movable unit 30a), which should be moved to, corresponding to the hand-shake quantity which is calculated, for the first direction x and the second direction y, when the photographing apparatus 1 is in the anti-shake mode.

The location in the first direction x of the position S is defined as sx, and the location in the second direction y of the position S is defined as sy. The movement of the movable unit 30a, which includes the imaging unit 39a, is performed by using electromagnetic force and is described later. The driving force D, which drives the driver circuit 29 in order to move the movable unit 30a to the position S, has a first PWM duty dx as the driving-force component in the first direction x, and a second PWM duty dy as the driving-force component in the second direction y.

The anti-shake and wide-angle imaging unit 30 is an apparatus which corrects the hand-shake effect, by moving a center of the imaging device 39a1 of the imaging unit 39a to the position S, by canceling lag of the photographic subject image on the imaging surface of the imaging device 39a1, and by stabilizing the photographing subject image that reaches the imaging surface of the imaging device 39a1.

The anti-shake and wide-angle imaging unit 30 has a movable unit 30a, which includes the imaging unit 39a, and a fixed unit 30b. Or, the anti-shake and wide-angle imaging unit 30 is composed of a driving part which moves the movable unit 30a by electro-magnetic force to the position S, and a position-detecting part which detects the position of the movable unit 30a (a detected-position P).

The size and the direction of the electro-magnetic force are determined by the size and the direction of the current which flows in the coil, and the size and the direction of the magnetic-field of the magnet.

When the photographing apparatus 1 is in the wide-angle imaging mode, the anti-shake and wide-angle imaging unit 30 obtains a wide-angle image signal PsW which comprises a first image signal Ps1, a second image signal Ps2, a third image signal Ps3, and a fourth image signal Ps4.

The first image signal Ps1 is obtained by the imaging operation under the condition where the movable unit 30a is moved and contacts a first corner edge point pe1 (a first imaging operation).

The second image signal Ps2 is obtained by the imaging operation under the condition where the movable unit 30a is moved and contacts a second corner edge point pe2 (a second imaging operation).

The third image signal Ps3 is obtained by the imaging operation under the condition where the movable unit 30a is moved and contacts a third corner edge point pe3 (a third imaging operation).

The fourth image signal Ps4 is obtained by the imaging operation under the condition where the movable unit 30a is moved and contacts a fourth corner edge point pe4 (a fourth imaging operation).

The movable unit 30a is moved to a point where the movable unit 30a contacts the first corner edge point pe1, or the second corner edge point pe2, or the third corner edge point pe3, or the fourth corner edge point pe4, by the electro-magnetic force generated by the coil and magnet, in the wide-angle imaging mode.

The movable unit 30a is moved to a point in the anti-shake mode, by the electro-magnetic force based on the coil and magnet, in the anti-shake mode.

The movable unit 30a is movable in both the first direction x and the second direction y, however the photographing optical system 67 is not movable (fixed). Accordingly, the imaging field IF is moved corresponding to the movement of the movable unit 30a, however the direction of the optical axis LX is not changed.

Because the direction of the optical axis LX is not changed even if the movable unit 30a is moved for obtaining the wide-angle image PicW, the combined image, which is the wide-angle image PicW, does not have a distortion component at the connecting areas (near the overlapping area).

The first corner edge point pe1 is one of the two corner edge points of the movable unit's movement range in the first direction x, and is one of the two corner edge points of the movable unit's movement range in the second direction y. When the movable unit 30a contacts the first corner edge point pe1, the position of the center of the imaging device 39a1 of the movable unit 30a is defined as a first position S1 (see FIG. 4).

The second corner edge point pe2 is another of the two corner edge points of the movable unit's movement range in the first direction x, and is one of the two corner edge points of the movable unit's movement range in the second direction y. When the movable unit 30a contacts the second corner edge point pe2, the position of the center of the imaging device 39a1 of the movable unit 30a is defined as a second position S2 (see FIG. 5).

The third corner edge point pe3 is another of the two corner edge points of the movable unit's movement range in the first direction x, and is another of the two corner edge points of the movable unit's movement range in the second direction y. When the movable unit 30a contacts the third corner edge point pe3, the position of the center of the imaging device 39a1 of the movable unit 30a is defined as a third position S3 (see FIG. 6).

The fourth corner edge point pe4 is one of the two corner edge points of the movable unit's movement range in the first direction x, and is another of the two corner edge points of the movable unit's movement range in the second direction y. When the movable unit 30a contacts the fourth corner edge point pe4, the position of the center of the imaging device 39a1 of the movable unit 30a is defined as a fourth position S4 (see FIG. 7).

The movable unit's movement range (the movement range of the center of the imaging device 39a1 of the movable unit 30a) is equal to a range which is tied up and surrounded by the first, second, third, and fourth corner edge points pe1, pe2, pe3, and pe4.

When the wide-angle imaging switch 15a is set to the on state so that the wide-angle imaging operation is performed, and when the movable unit 30a is moved to the first position S1, an image signal which is obtained by the imaging device 39a1 is defined as a first image signal Ps1 (the first imaging operation).

When the wide-angle imaging switch 15a is set to the on state so that the wide-angle imaging operation is performed, and when the movable unit 30a is moved to the second position S2, an image signal which is obtained by the imaging device 39a1 is defined as a second image signal Ps2 (the second imaging operation).

When the wide-angle imaging switch 15a is set to the on state so that the wide-angle imaging operation is performed, and when the movable unit 30a is moved to the third position S3, an image signal which is obtained by the imaging device 39a1 is defined as a third image signal Ps3 (the third imaging operation).

When the wide-angle imaging switch 15a is set to the on state so that the wide-angle imaging operation is performed, and when the movable unit 30a is moved to the fourth position S4, an image signal which is obtained by the imaging device 39a1 is defined as a fourth image signal Ps4 (the fourth imaging operation).

It is desirable that the CPU 21 controls the order of movement of the movable unit 30a (the order of the first, second, third, and fourth imaging operations) to be right-handed or left-handed viewed from the third direction z. In the first embodiment, the order of movement of the movable unit 30a is right-handed viewed from the third direction z, that is a first movement is to the first position S1, a second is to the second position S2, a third is to the third position S3, and a fourth is to the fourth position S4.

The driving of the movable unit 30a of the anti-shake and wide-angle imaging unit 30, is performed by the driver circuit 29 which has the first PWM duty dx input from the PWM 0 of the CPU 21 and has the second PWM duty dy input from the PWM 1 of the CPU 21. The detected-position P of the center of the imaging device 39a1 of the movable unit 30a, either before moving or after moving, which is moved by driving the driver circuit 29, is detected by the hall element unit 44a and the hall-element signal-processing unit 45.

Information of a first location in the first direction x for the detected-position P, in other words a first detected-position signal px is input to the A/D converter A/D 2 of the CPU 21. The first detected-position signal px is an analogue signal, and is converted to a digital signal through the A/D converter A/D 2 (A/D converting operation). The first location in the first direction x for the detected-position P, after the A/D converting operation, is defined as pdx, corresponding to the first detected-position signal px.

Information of a second location in the second direction y for the detected-position P, in other words a second detected-position signal py is input to the A/D converter A/D 3 of the CPU 21. The second detected-position signal py is an analogue signal, and is converted to a digital signal through the A/D converter A/D 3 (A/D converting operation). The second location in the second direction y for the detected-position P, after the A/D converting operation, is defined as pdy, corresponding to the second detected-position signal py.

The PID (Proportional Integral Differential) control is performed on the basis of the data for the detected-position P (pdx, pdy) and the data for the position S (sx, sy) which should be moved to.

The values of the first and second PWM duties dx and dy for moving the movable unit 30a to the first, second, third, and fourth positions S1, S2, S3, and S4, are stored in the CPU 21. Accordingly, when the movable unit 30a is moved to the first, second, third, and fourth position S1, S2, S3, and S4, in the wide-angle imaging mode, the PID control may not be performed.

The values of the first and second PWM duties dx and dy for moving the movable unit 30a to the first, second, third, and fourth positions S1, S2, S3, and S4, are set in advance, considering an effect of gravity etc. which is changed by the direction of holding the photographing apparatus 1.

The movable unit 30a has a first coil 31a, a second coil 32a, an imaging unit 39a, a hall element unit 44a, a movable circuit board 49a, a shaft for movement 50a, a first bearing unit for horizontal movement 51a, a second bearing unit for horizontal movement 52a, a third bearing unit for horizontal movement 53a, and a plate 64a (see FIGS. 13 and 14).

The fixed unit 30b has a first magnet 411b, a second magnet 412b, a first yoke 431b, a second yoke 432b, a first bearing unit for vertical movement 54b, a second bearing unit for vertical movement 55b, a third bearing unit for vertical movement 56b, a fourth bearing unit for vertical movement 57b, and a base board 65b.

The shaft for movement 50a of the movable unit 30a has a channel shape when viewed from the third direction z. The first, second, third, and fourth bearing units for vertical movement 54b, 55b, 56b, and 57b are attached to the base board 65b of the fixed unit 30b. The shaft for movement 50a is slidably supported in the vertical direction (the second direction y), by the first, second, third, and fourth bearing units for vertical movement 54b, 55b, 56b, and 57b.

The first and second bearing units for vertical movement 54b and 55b have slots which extend in the second direction y.

Therefore, the movable unit 30a can move relative to the fixed unit 30b, in the vertical direction (the second direction y) linearly.

The shaft for movement 50a is slidably supported in the horizontal direction (the first direction x), by the first, second, and third bearing units for horizontal movement 51a, 52a, and 53a of the movable unit 30a. Therefore, the movable unit 30a, except for the shaft for movement 50a, can move relative to the fixed unit 30b and the shaft for movement 50a, in the horizontal direction (the first direction x) linearly.

The imaging device has an imaging field IF which has a first length L1 in the first direction x and has a second length L2 in the second direction y.

Figure 8:
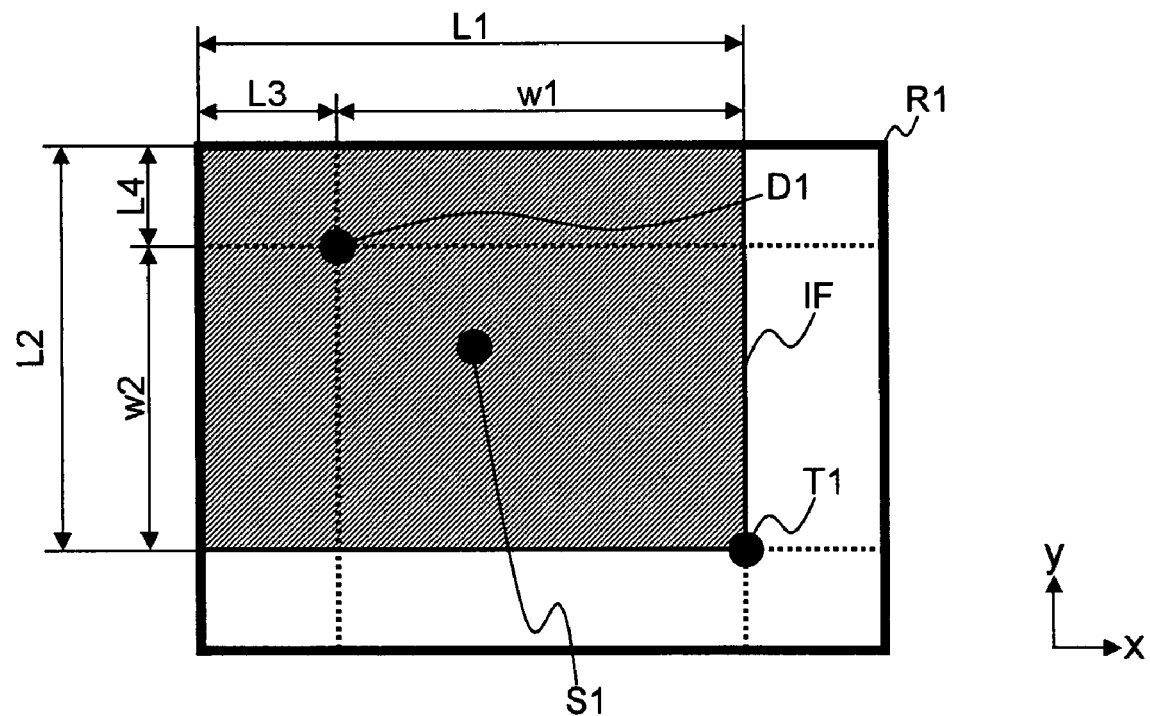
FIG. 8 shows a position relation of the imaging field, when the movable unit is in the first position.
Figure 9:
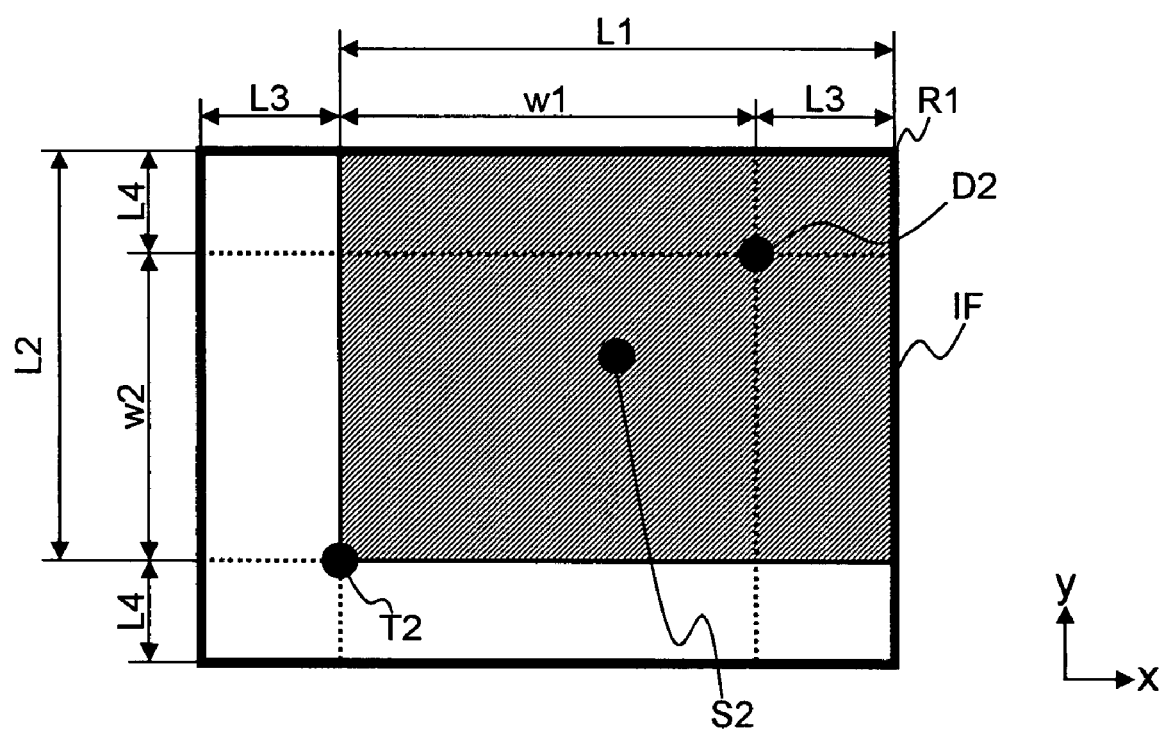
FIG. 9 shows a position relation of the imaging field, when the movable unit is in the second position.

A second position S2's side area of the imaging field IF when the movable unit 30a is moved to the first position S1, and a first position S1's side area of the imaging field IF when the movable unit 30a is moved to the second position S2, have an overlapping area which has a first width w1 in the first direction x and has the second length L2 in the second direction y (see FIGS. 8 and 9).

Figure 10:
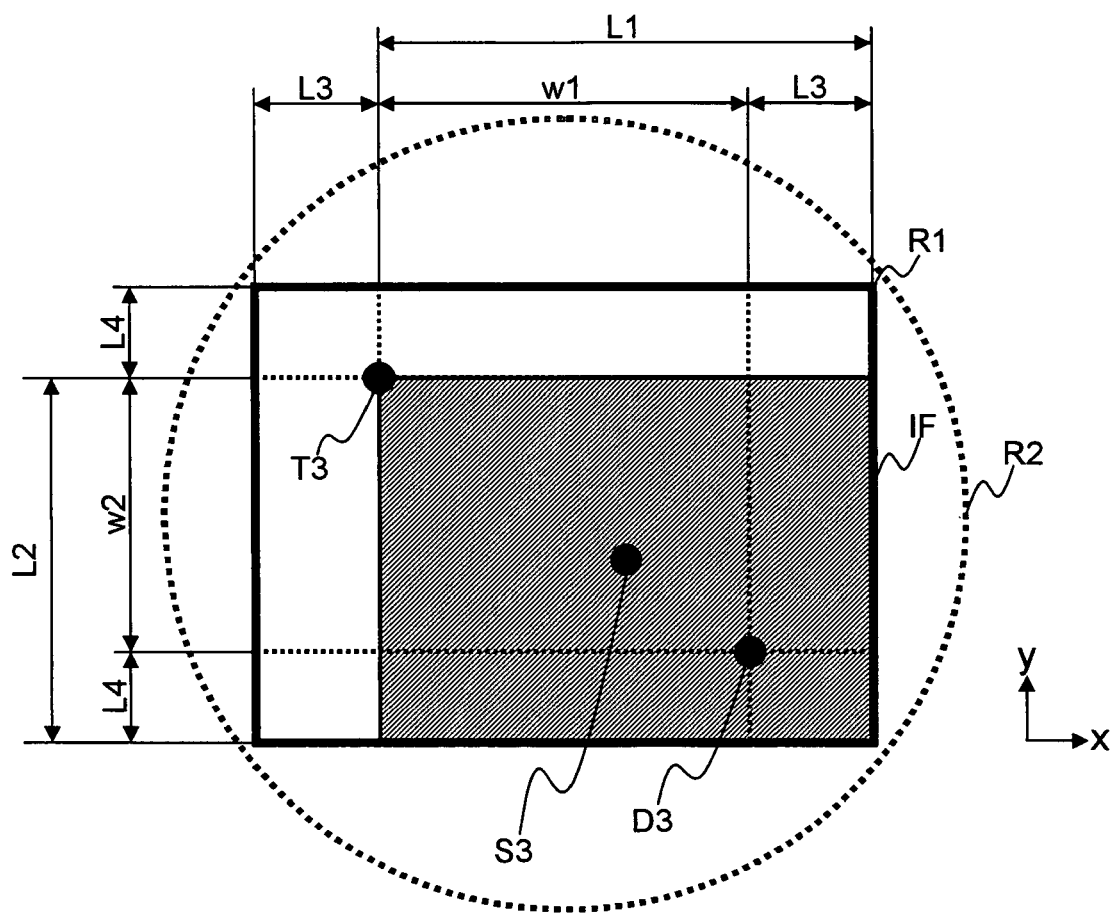
FIG. 10 shows a position relation of the imaging field, when the movable unit is in the third position.

A third position S3's side area of the imaging field IF when the movable unit 30a is moved to the second position S2, and a second position S2's side area of the imagine field IF when the movable unit 30a is moved to the third position S3, have an overlapping area which has the first length L1 in the first direction x and has a second width w2 in the second direction y (see FIGS. 9 and 10).

A movement range R1 of the imaging field IF both in the first direction x and the second direction y, is inside a range R2 of an image circle (see FIG. 10). The image circle is equal to an imaging range of the light through the photographing optical system 67, on the imaging surface of the imaging device 39a1.

Accordingly, it is desirable that the first and second widths w1 and w2 are set to be as short as possible under the above conditions, in order to perform the wide-angle imaging operation at a wider range in comparison with when the first and second widths w1 and w2 are set to be long.

When the first indication for the through image, and the second indication for the normal still image are performed, the imaging operation is performed under the condition where the movable unit 30a (the center of the imaging device 39a1) is moved to the position S(sx, sy). The value of the position S(sx, sy) is calculated in the anti-shake mode (IS=1). The value of the position S(sx, sy) is set to the center of the movable unit's movement range, in the non anti-shake mode (IS=0).

When the third indication for the wide-angle still image is performed, the first imaging operation is performed under the condition where the movable unit 30a is moved to the first position S1, so that the first image signal Ps1 is temporally stored in the CPU 21. The second imaging operation is performed under the condition where the movable unit 30a is moved to the second position S2, so that the second image signal Ps2 is temporally stored in the CPU 21. The third imaging operation is performed under the condition where the movable unit 30a is moved to the third position S3, so that the third image signal Ps3 is temporally stored in the CPU 21. The fourth imaging operation is performed under the condition where the movable unit 30a is moved to the fourth position S4, so that the fourth image signal Ps4 is temporally stored in the CPU 21.

Overlapping areas between first image Pic1 based on the first image signal Ps1, a second image Pic2 based on the second image signal Ps2, a third image Pic3 based on the third image signal Ps3, and a fourth image Pic4 based on the fourth image signal Ps4, are overlapped, so that the first, second, third, and fourth image signals Ps1, Ps2, Ps3, and Ps4 are connected. And then, the wide-angle image signal PsW is obtained by the combination. An image signal corresponding to the overlapping area is one of the first, second, third, and fourth image signals Ps1, Ps2, Ps3, and Ps4. In other words, in the combination of the first, second, third, and fourth image signals Ps1, Ps2, Ps3, and Ps4, each signal is addressed regarding the overlapping area, and each signal is added regarding the non overlapping area.

A size and a position of the overlapping area between the first, second, third, and fourth images Pic1, Pic2, Pic3, and Pic4, are determined on the basis of the size of the imaging field IF (the lengths of the first and second lengths L1 and L2), and the lengths of the first and second widths w1 and w2. The values of the first and second lengths L1 and L2 and the first and second widths w1 and w2 are determined by the design conditions of the photographing apparatus 1.

The information regarding the size and the position of the overlapping area between the first, second, third, and fourth images Pic1, Pic2, Pic3, and Pic4, is stored in the memory of the CPU 21, as coordinate data. The coordinate data has a first coordinate data D1 and a first edge-point coordinate data T1 for when the movable unit 30a is moved to the first position S1, and has a second coordinate data D2 and a second edge-point coordinate data T2 for when the movable unit 30a is moved to the second position S2, and has a third coordinate data D3 and a third edge-point coordinate data T3 for when the movable unit 30a is moved to the third position S3, and has a fourth coordinate data D4 and a fourth edge-point coordinate data T4 for when the movable unit 30a is moved to the fourth position S4.

When the movable unit 30a is in the first position S1, the first coordinate data D1 and the first edge-point coordinate data T1 are used as the corresponding coordinate information for the imaging device 39a1 (see FIG. 8).

A rectangular area which has a peripheral line being parallel to the first direction x and passing through the first coordinate data D1, a peripheral line being parallel to the second direction y and passing through the first coordinate data D1, a peripheral line being parallel to the first direction x and passing through the first edge-point coordinate data T1, and a peripheral line being parallel to the second direction y and passing through the first edge-point coordinate data T1, shows a field of pixels of the imaging device 39a1 which is used for imaging and that overlap when the movable unit 30a is in the second position S2, or the third position S3, or the fourth position S4.

The first edge-point coordinate data T1 is one of four coordinate data which compose the imaging field IF of the imaging device 39a1.

When the movable unit 30a is in the second position S2, the second coordinate data D2 and the second edge-point coordinate data T2 are used as the corresponding coordinate information for the imaging device 39a1 (see FIG. 9).

A rectangular area which has a peripheral line being parallel to the first direction x and passing through the second coordinate data D2, a peripheral line being parallel to the second direction y and passing through the second coordinate data D2, a peripheral line being parallel to the first direction x and passing through the second edge-point coordinate data T2, and a peripheral line being parallel to the second direction y and passing through the second edge-point coordinate data T2, shows a field of pixels of the imaging device 39a1 which is used for imaging and that overlap when the movable unit 30a is in the first position S1, or the third position S3, or the fourth position S4.

The second edge-point coordinate data T2 is one of four coordinate data which compose the imaging field IF of the imaging device 39a1.

When the movable unit 30a is in the third position S3, the third coordinate data D3 and the third edge-point coordinate data T3 are used as the corresponding coordinate information for the imaging device 39a1 (see FIG. 10).

A rectangular area which has a peripheral line being parallel to the first direction x and passing through the third coordinate data D3, a peripheral line being parallel to the second direction y and passing through the third coordinate data D3, a peripheral line being parallel to the first direction x and passing through the third edge-point coordinate data T3, and a peripheral line being parallel to the second direction y and passing through the third edge-point coordinate data T3, shows a field of pixels of the imaging device 39a1 which is used for imaging and that overlap when the movable unit 30a is in the first position S1, or the second position S2, or the fourth position S4.

The third edge-point coordinate data T3 is one of four coordinate data which compose the imaging field IF of the imaging device 39a1.

Figure 11:
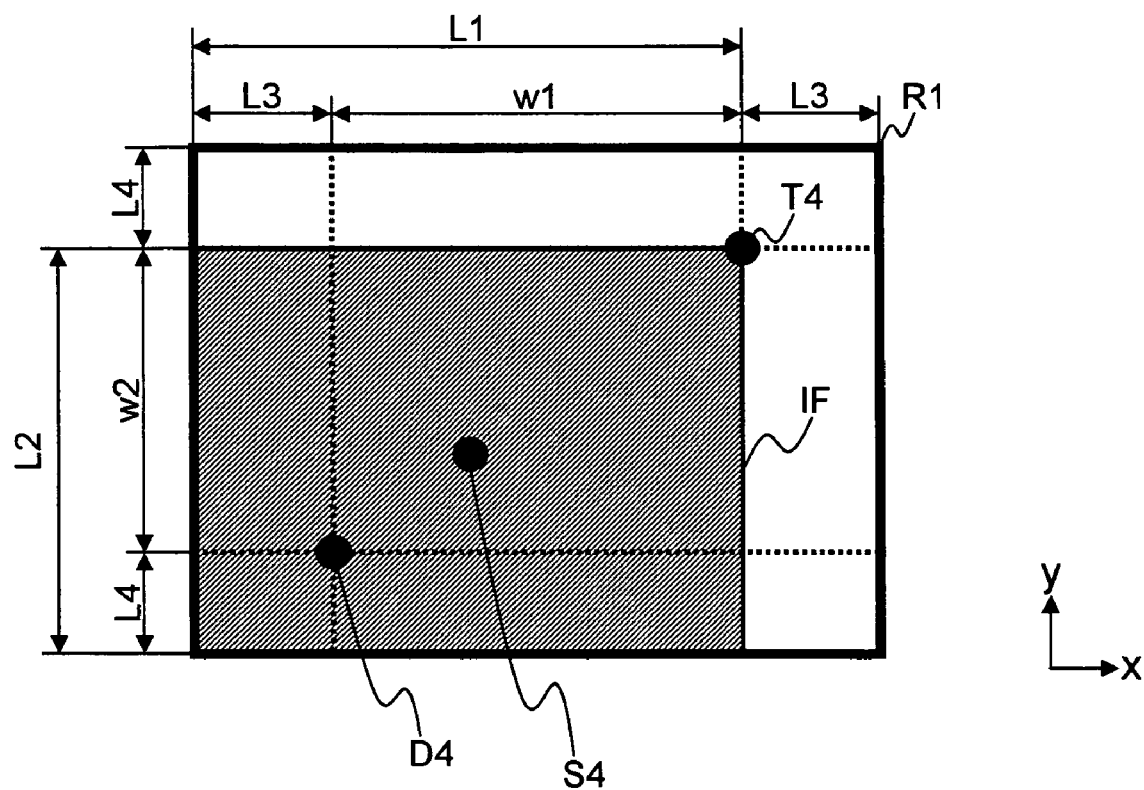
FIG. 11 shows a position relation of the imaging field, when the movable unit is in the fourth position.

When the movable unit 30a is in the fourth position S4, the fourth coordinate data D4 and the fourth edge-point coordinate data T4 are used as the corresponding coordinate information for the imaging device 39a1 (see FIG. 11).

A rectangular area which has a peripheral line being parallel to the first direction x and passing through the fourth coordinate data D4, a peripheral line being parallel to the second direction y and passing through the fourth coordinate data D4, a peripheral line being parallel to the first direction x and passing through the fourth edge-point coordinate data T4, and a peripheral line being parallel to the second direction y and passing through the fourth edge-point coordinate data T4, shows a field of pixels of the imaging device 39a1 which is used for imaging and that overlap when the movable unit 30a is in the first position S1, or the second position S2, or the third position S3.

The fourth edge-point coordinate data T4 is one of four coordinate data which compose the imaging field IF of the imaging device 39a1.

The CPU 21 recognizes the overlapping imaging field based on the first coordinate data D1, the second coordinate data D2, the third coordinate data D3, the fourth coordinate data D4, the first edge-point coordinate data T1, the second edge-point coordinate data T2, the third edge-point coordinate data T3, and the fourth edge-point coordinate data T4, and combines the first, second, third, and fourth image signals Ps1, Ps2, Ps3, and Ps4, for obtaining the wide-angle image signal PsW.

After the first, second, third, and fourth imaging operations, a wide-angle image PicW based on the wide-angle image signal PsW is indicated on the indicating field of the indicating unit 17. The wide-angle image signal PsW is stored in the memory 18.

Only one of the image signals regarding the overlapping area may be temporally stored in the CPU 21.

Accordingly, in the case that the imaging device 39a1 is an imaging device in which the accumulated electric charge for a specific part can be read out, such as a CMOS etc., the image signal which is converted from the electric signal on the basis of the accumulated electric charge which is read out for the part of the imaging field IF which is needed for the combination, may be temporally stored in the CPU 21, as the first, second, third, and fourth image signals Ps1, Ps2, Ps3, and Ps4.

Therefore, a capacity of the memory of the CPU 21 which is needed for temporally storing, can be reduced, so that the response speed of the operation can be high.

In this case, the wide-angle image signal PsW is formed from the first, second, third, and fourth image signals Ps1, Ps2, Ps3, and Ps4, under the condition where the first, second, third, and fourth images Pic1, Pic2, Pic3, and Pic4 are bounded to each other.

Figure 12:
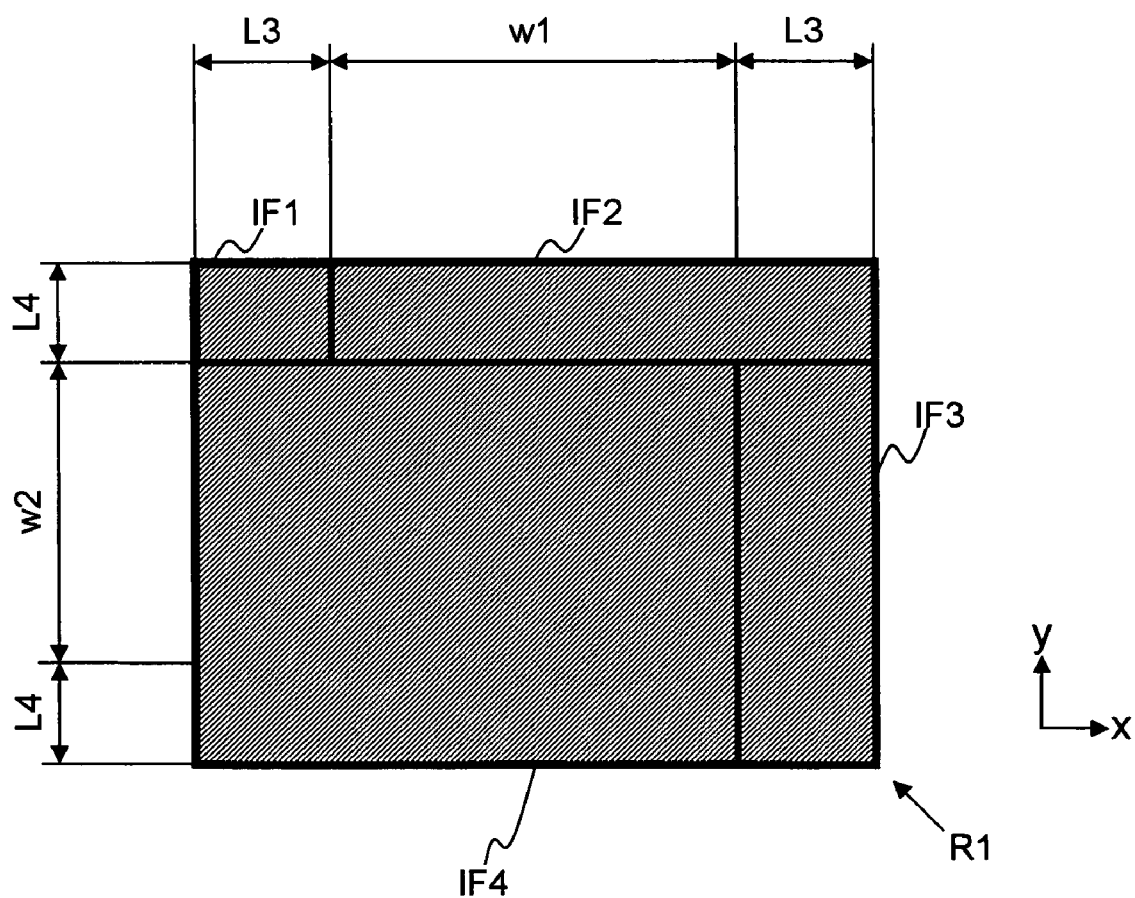
FIG. 12 is a construction diagram which simply shows a position relation between the first, second, third, and fourth imaging fields.

In the first embodiment, when the movable unit 30a is in the first position S1, an area of the imaging field IF which is imaged without overlapping when the movable unit 30a is in the second position S2, or the third position S3, or the fourth position S4, is defined as a first imaging field IF1. The first image signal Ps1 which is based on the accumulated electric charge in the first imaging field IF1, is temporally stored in the CPU 21. The first imaging field IF1 is rectangular and has a third length L3 in the first direction x and a fourth length L4 in the second direction y (see FIG. 12).

When the movable unit 30a is in the second position S2, an area of the imaging field IF which is imaged without overlapping when the movable unit 30a is in the third position S3, or the fourth position S4, is defined as a second imaging field IF2. The second image signal Ps2 which is based on the accumulated electric charge in the second imaging field IF2, is temporally stored in the CPU 21. The second imaging field IF2 is rectangular and has the first length L1 in the first direction x and the fourth length L4 in the second direction y.

When the movable unit 30a is in the third position S3, an area of the imaging field IF which is imaged without overlapping when the movable unit 30a is in the fourth position S4, is defined as a third imaging field IF3. The third image signal Ps3 which is based on the accumulated electric charge in the third imaging field IF3, is temporally stored in the CPU 21. The third imaging field IF3 is rectangular and has the third length L3 in the first direction x and the second length L2 in the second direction y.

When the movable unit 30a is in the fourth position S4, an area of the imaging field IF is defined as a fourth imaging field IF4. The fourth image signal Ps4 which is based on the accumulated electric charge in the fourth imaging field IF4, is temporally stored in the CPU 21. The is fourth imaging field IF4 is rectangular and has the first length L1 in the first direction x and the second length L2 in the second direction y.

When the center area of the imaging field IF of the imaging device 39a1 is located on the optical axis LX of the photographing optical system 67, the location relation between the movable unit 30a and the fixed unit 30b is set up so that the imaging field IF is located at the center of its movement range R1 in both the first direction x and the second direction y.

A rectangle shape, which forms the imaging surface (the valid pixel area) of the imaging device 39a1, and which is the imaging field IF, has two diagonal lines. In the first embodiment, the center of the imaging field IF is the crossing point of these two diagonal lines.

In the first embodiment, the center of the imaging field IF agrees with the center of gravity of the rectangle shape of the valid pixel area. Accordingly, when the movable unit 30a is located at the center of its movement range R1, the center of gravity of the rectangle shape of the valid pixel area is located on the optical axis LX of the photographing optical system 67.

Moving the movable unit 30a in the first direction x is performed by using a first electro-magnetic force.

Moving the movable unit 30a in the second direction y is performed by using a second electromagnetic force.

The first electromagnetic force occurs on the basis of the current direction of the first coil 31a and the magnetic-field direction of the first magnet 411b.

The second electro-magnetic force occurs on the basis of the current direction of the second coil 32a and the magnetic-field direction of the second magnet 412b.

The imaging unit 39a, the plate 64a, and the movable circuit board 49a are attached, in this order along the optical axis LX direction, viewed from the side of the photographing optical system 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third bearing units for horizontal movement 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the photographing optical system 67. In the case where the plate 64a is made of a metallic material, the plate 64a has the effect of radiating heat from the imaging device 39a1, by contacting the imaging device 39a1.

The first coil 31a, the second coil 32a, and the hall element unit 44a are attached to the movable circuit board 49a.

The first coil 31a forms a seat and a spiral shape coil pattern. The coil pattern of the first coil 31a has a line segment which is parallel to the second direction y, where the movable unit 30a which includes the first coil 31a, is moved in the first direction x, by the first electro-magnetic force. The line segment which is parallel to the second direction y, is used for moving the movable unit 30a in the first direction x. The line segment which is parallel to the second direction y, has a first effective length LE1.

The second coil 32a forms a seat and a spiral shape coil pattern. The coil pattern of the second coil 32a has a line segment which is parallel to the first direction x, where the movable unit 30a which includes the second coil 32a, is moved in the second direction y, by the second electromagnetic force. The line segment which is parallel to the first direction x, is used for moving the movable unit 30a in the second direction y. The line segment which is parallel to the first direction x, has a second effective length LE2.

The first and second coils 31a and 32a are connected with the driver circuit 29 which drives the first and second coils 31a and 32a through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first coil 31a corresponding to the value of the first PWM duty dx, and to the second coil 32a corresponding to the value of the second PWM duty dy, to drive the movable unit 30a.

The first magnet 411b is attached to the movable unit side of the fixed unit 30b, where the first magnet 411b faces the first coil 31a and the first hall element hh10 in the third direction z.

The second magnet 412b is attached to the movable unit side of the fixed unit 30b, where the second magnet 412b faces the second coil 32a and the second hall element hv10 in the third direction z.

The first magnet 411b is attached to the first yoke 431b, under the condition where the N pole and S pole are arranged in the first direction x. The first yoke 431b is attached to the base board 65b of the fixed unit 30b, on the side of the movable unit 30a, in the third direction z.

The length of the first magnet 411b in the second direction y, is longer in comparison with the first effective length LE1 of the first coil 31a. The magnetic-field which influences the first coil 31a and the first hall element hh10, is not changed during movement of the movable unit 30a in the second direction y.

The second magnet 412b is attached to the second yoke 432b, under the condition where the N pole and S pole are arranged in the second direction y. The second yoke 432b is attached to the base board 65b of the fixed unit 30b, on the side of the movable unit 30a, in the third direction z.

The length of the second magnet 412b in the first direction x, is longer in comparison with the second effective length LE2 of the second coil 32a. The magnetic-field which influences the second coil 32a and the second hall element hv10, is not changed during movement of the movable unit 30a in the first direction x.

The first yoke 431b is made of a soft magnetic material, and forms a square-u-shape channel when viewed from the second direction y. The first magnet 411b, the first coil 31a, and the first hall element hh10 are inside the channel of the first yoke 431b.

The side of the first yoke 431b, which contacts the first magnet 411b, prevents the magnetic-field of the first magnet 411b from leaking to the surroundings.

The other side of the first yoke 431b (which faces the first magnet 411b, the first coil 31a, and the movable circuit board 49a) raises the magnetic-flux density between the first magnet 411b and the first coil 31a, and between the first magnet 411b and the first hall element hh10.

The second yoke 432b is made of a soft magnetic material, and forms a square-u-shape channel when viewed from the first direction x. The second magnet 412b, the second coil 32a, and the second hall element hv10 are inside the channel of the second yoke 432b.

The side of the second yoke 432b, which contacts the second magnet 412b, prevents the magnetic-field of the second magnet 412b from leaking to the surroundings.

The other side of the second yoke 432b (which faces the second magnet 412b, the second coil 32a, and the movable circuit board 49a) raises the magnetic-flux density between the second magnet 412b and the second coil 32a, and between the second magnet 412b and the second hall element hv10.

The hall element unit 44a is a one-axis hall element which has two hall elements that are magnetoelectric converting elements (magnetic-field change-detecting elements) using the Hall Effect. The hall element unit 44a detects the first detected-position signal px which is used for specifying the first location in the first direction x for the present position P of the movable unit 30a, and the second detected-position signal py which is used for specifying the second location in the second direction y for the present position P of the movable unit 30a.

One of the two hall elements is a first hall element hh10 for detecting the first location in the first direction x of the movable unit 30a, so that the other is a second hall element hv10 for detecting the second location in the second direction y of the movable unit 30a (see FIG. 13).

The first hall element hh10 is attached to the movable circuit board 49a of the movable unit 30a, under the condition where the first hall element hh10 faces the first magnet 411b of the fixed unit 30b, in the third direction z.

The second hall element hv10 is attached to the movable circuit board 49a of the movable unit 30a, under the condition where the second hall element hv10 faces the second magnet 412b of the fixed unit 30b, in the third direction z.

When the center of the imaging device 39a1, passes through the optical axis LX, it is desirable that the first hall element hh10 is located at a place on the hall element unit 44a which faces an intermediate area between the N pole and S pole of the first magnet 411b in the first direction x, viewed from the third direction z, to perform the position-detecting operation utilizing the full size of the range where an accurate position-detecting operation can be performed based on the linear output-change (linearity) of the one-axis hall element.

Similarly, when the center of the imaging device 39a1, passes through the optical axis LX, it is desirable that the second hall element hv10 is located at a place on the hall element unit 44a which faces an intermediate area between the N pole and S pole of the second magnet 412b in the second direction y, viewed from the third direction z.

The base board 65b is a plate state member which becomes the base for attaching the first yoke 431b etc., and is arranged being parallel to the imaging surface of the imaging device 39a1.

In the first embodiment, the base board 65b is arranged at the side nearer to the photographing optical system 67 in comparison with the movable circuit board 49a, in the third direction z. However, the movable circuit board 49a may be arranged at the side nearer to the photographing optical system 67 in comparison with the base board 65b. In this case, the first and second coils 31a and 32a, and the hall element unit 44a are arranged on the opposite side of the movable circuit board 49a to the photographing optical system 67, so that the first and second magnets 411b and 412b are arranged on the same side of the base board 65b as the photographing optical system 67.

The hall-element signal-processing unit 45 has a first hall-element signal-processing circuit 450 and a second hall-element signal-processing circuit 460.

The first hall-element signal-processing circuit 450 detects a horizontal potential-difference x10 between output terminals of the first hall element hh10, based on an output signal of the first hall element hh10.

The first hall-element signal-processing circuit 450 outputs the first detected-position signal px, which specifies the first location in the first direction x of the movable unit 30a, to the A/D converter A/D 2 of the CPU 21, on the basis of the horizontal potential-difference x10.

The second hall-element signal-processing circuit 460 detects a vertical potential-difference y10 between output terminals of the second hall element hv10, based on an output signal of the second hall element hv10.

The second hall-element signal-processing circuit 460 outputs the second detected-position signal py, which specifies the second location in the second direction y of the movable unit 30a, to the A/D converter A/D 3 of the CPU 21, on the basis of the vertical potential-difference y10.

Figure 15:
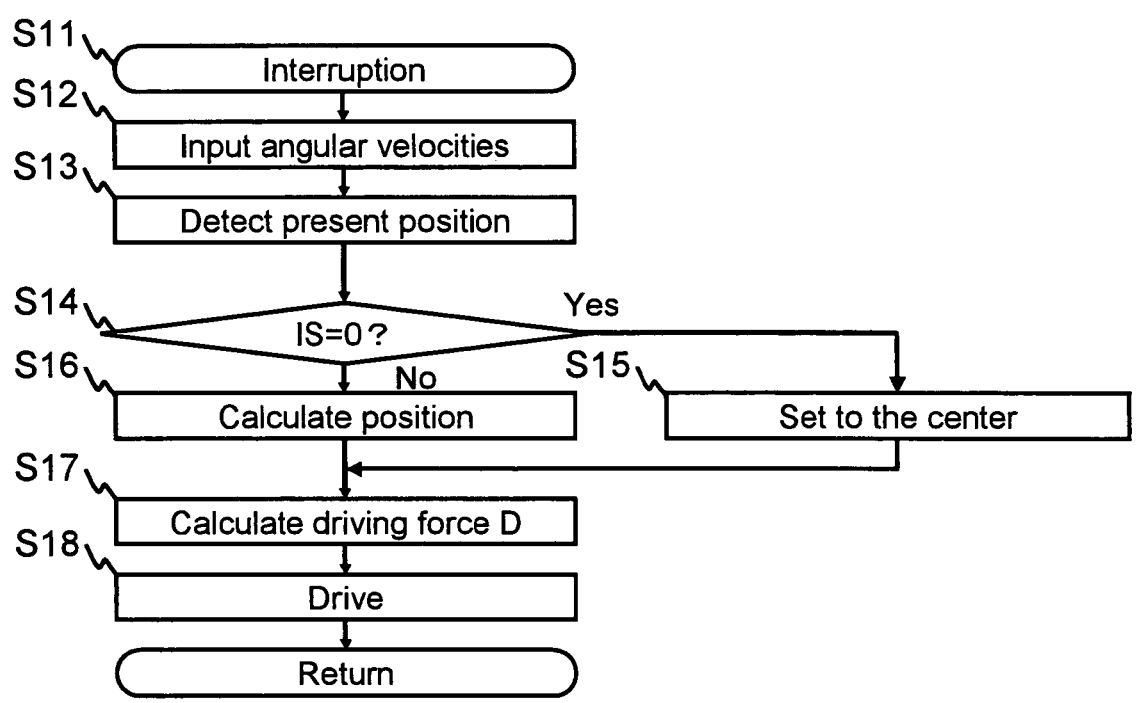
FIG. 15 is a flowchart of the anti-shake operation, which is performed at every second predetermined time interval, as an interruption process, in the first embodiment.

Next, the flow of the anti-shake operation, which is performed at every second predetermined time interval (1 ms) as an interruption process, independently of the other operations, is explained by using the flowchart in FIG. 15.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the position of the movable unit 30a is detected by the hall element unit 44a, so that the first detected-position signal px, which is calculated by the hall-element signal-processing unit 45, is input to the A/D converter A/D 2 of the CPU 21 and is converted to a digital signal (pdx), and the second detected-position signal py, which is calculated by the hall-element signal-processing unit 45, is input to the A/D converter A/D 3 of the CPU 21 and is converted to a digital signal (pdy). Therefore, the present position of the movable unit 30a P (pdx, pdy) is determined.

In step S14, it is judged whether the value of the IS is 0. When it is judged that the value of the IS is 0 (IS=0), in other words in the non anti-shake mode, the position S (sx, sy) of the movable unit 30a (the imaging unit 39a), which should be moved to, is set to the center of the movement range of the movable unit 30a, in step S15. When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S16.

In step S17, the driving force D, which drives the driver circuit 29 in order to move the movable unit 30a to the position S, in other words the first PWM duty dx and the second PWM duty dy, is calculated on the basis of the position S (sx, sy), which is determined in step S15 or step S16, and the present position P (pdx, pdy).

In step S18, the first coil unit 31a is driven by using the first PWM duty dx through the driver circuit 29, and the second coil unit 32a is driven by using the second PWM duty dy through the driver circuit 29, so that the movable unit 30a is moved.

The process in steps S17 and S18 is an automatic control calculation, which is used with the PID automatic control for performing general (normal) proportional, integral, and differential calculations.

Figure 16:
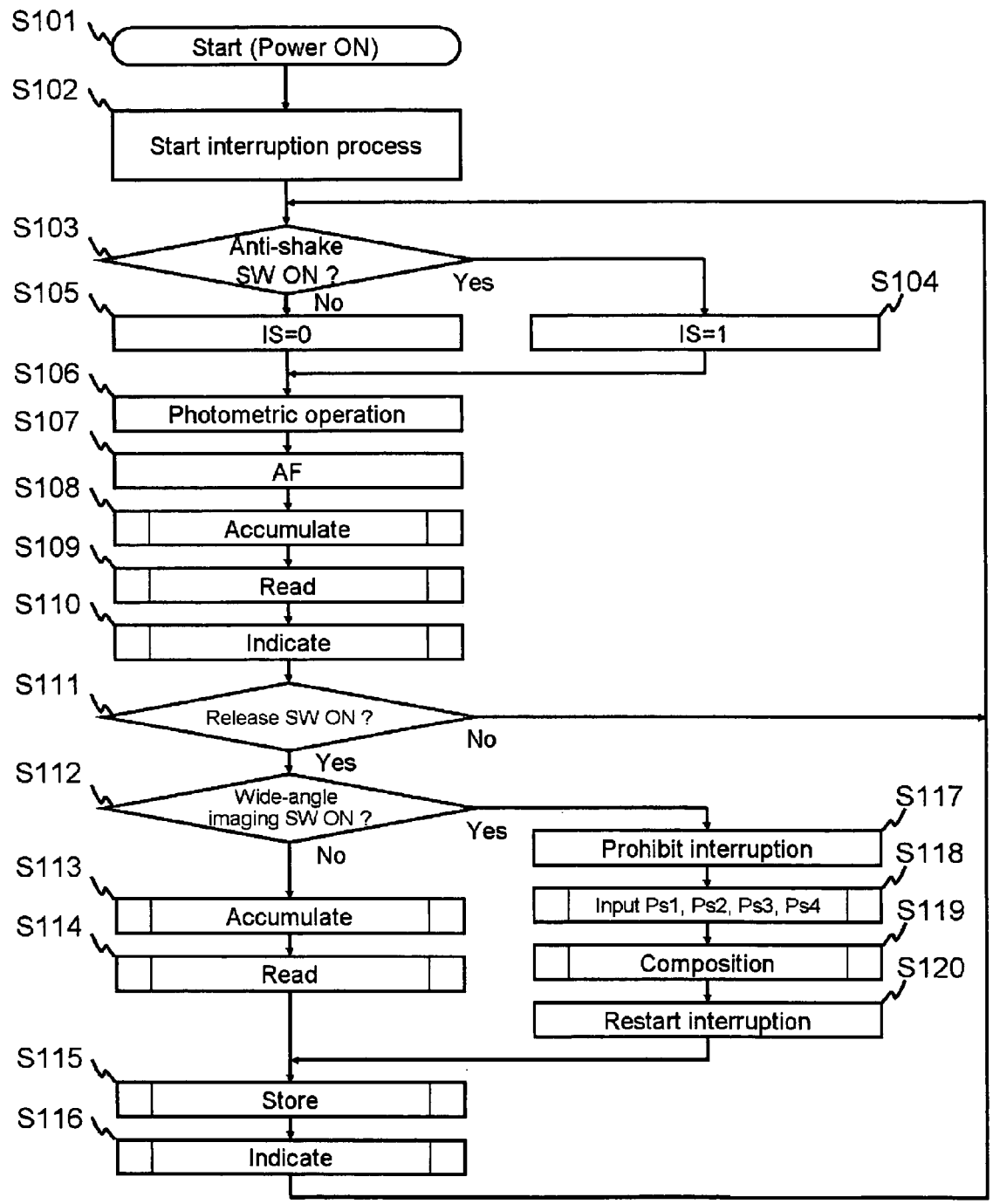
FIG. 16 is a flowchart of the imaging operation in the first embodiment.

Next, the flow of the imaging operation (the flow of the operation of the CPU 21) is explained by using the flowchart in FIG. 16.

In step S101, the Pon switch 11a is set to the on state (power on), so that the power of the photographing apparatus 1 is set to the on state. In step S102, the anti-shake operation, which is described by using the flowchart in FIG. 15, is started at every second predetermined time interval (1 ms) as an interruption process. The anti-shake operation is performed independently of the other operations after step S102.

In step S103, it is judged whether the anti-shake switch 14a is in the on state. When the anti-shake switch 14a is in the on state, the value of the parameter IS is set to 1 in step S104. When the anti-shake switch 14a is in the off state, the value of the parameter IS is set to 0 in step S105.

In step S106, the photometric operation is performed by driving an AE sensor of the AE unit 23, so that the aperture value and the time length of the exposure time are calculated. In step S107, the AF sensing operation is performed by driving an AF sensor of the AF unit 24, so that the focusing operation is performed by driving a lens control circuit of the AF unit 24.

In step S108, the electric charge is accumulated in the imaging device 39a1. In step S109, the electric charge, which is accumulated in the imaging device 39a1 in the exposure time, is read.

In step S110, the electric signal, obtained on the basis of the electric charge which is read, is converted to an image signal, so that the normal image, obtained on the basis of the image signal, is indicated on the indicating field of the indicating unit 17, in other words the first indication for the through image is performed.

In step S111, it is judged whether the release switch 13a is set to the on state by the operator. When the release switch 13a is not set to the on state, the process is returned to step S103, so that the imaging operation is repeated. When the release switch 13a is set to the on state, it is judged whether the wide-angle imaging switch 15a is set to the on state by the operator, in step S112.

When it is judged that the wide-angle imaging switch 15a is not set to the on state in step S112, the electric charge is accumulated in the imaging device 39a1 in step S113. In step S114, the electric charge, which is accumulated in the imaging device 39a1, is read. In step S115 after step S114, the electric signal based on the electric charge, which is read, is converted to the image signal, and the image signal is stored in the memory 18 in the photographing apparatus 1, as an image which is has been imaged. In step S116 after step S114, the image which is stored, is indicated on the indicating field of the indicating unit 17, in other words the second indication for the normal still image is performed. The process is then returned to step S103.

When it is judged that the wide-angle imaging switch 15*a* is set to the on state in step S112, the wide-angle imaging operation is performed. In step S117, the anti-shake operation as an interruption process is stopped (prohibited). In step S118, the first image signal Ps1 is input to and temporally stored in the CPU 21 (the first imaging operation), the second image signal Ps2 is input to and temporally stored in the CPU 21 (the second imaging operation), the third image signal Ps3 is input to and temporally stored in the CPU 21 (the third imaging operation), and the fourth image signal Ps4 is input to and temporally stored in the CPU 21 (the fourth imaging operation).

In step S119, the first, second, third, and fourth image signals Ps1, Ps2, Ps3, and Ps4 are combined as the wide-angle image signal PsW. This combination includes a making operation for the data of the thinning operation or the compressing operation.

In step S120, the prohibition state of the interruption is released, the anti-shake operation is re-started, so that the process is forwarded to step S115.

In step S115 after step S120, the wide-angle image signal PsW is stored in the memory 18 in the photographing apparatus 1, as the wide-angle image PicW which is imaged and combined. In step S117 after step S120, the wide-angle image PicW which is stored, is indicated on the indicating field of the indicating unit 17, in other words the third indication for the wide-angle still image is performed. The process is returned to step S103.

Figure 17:
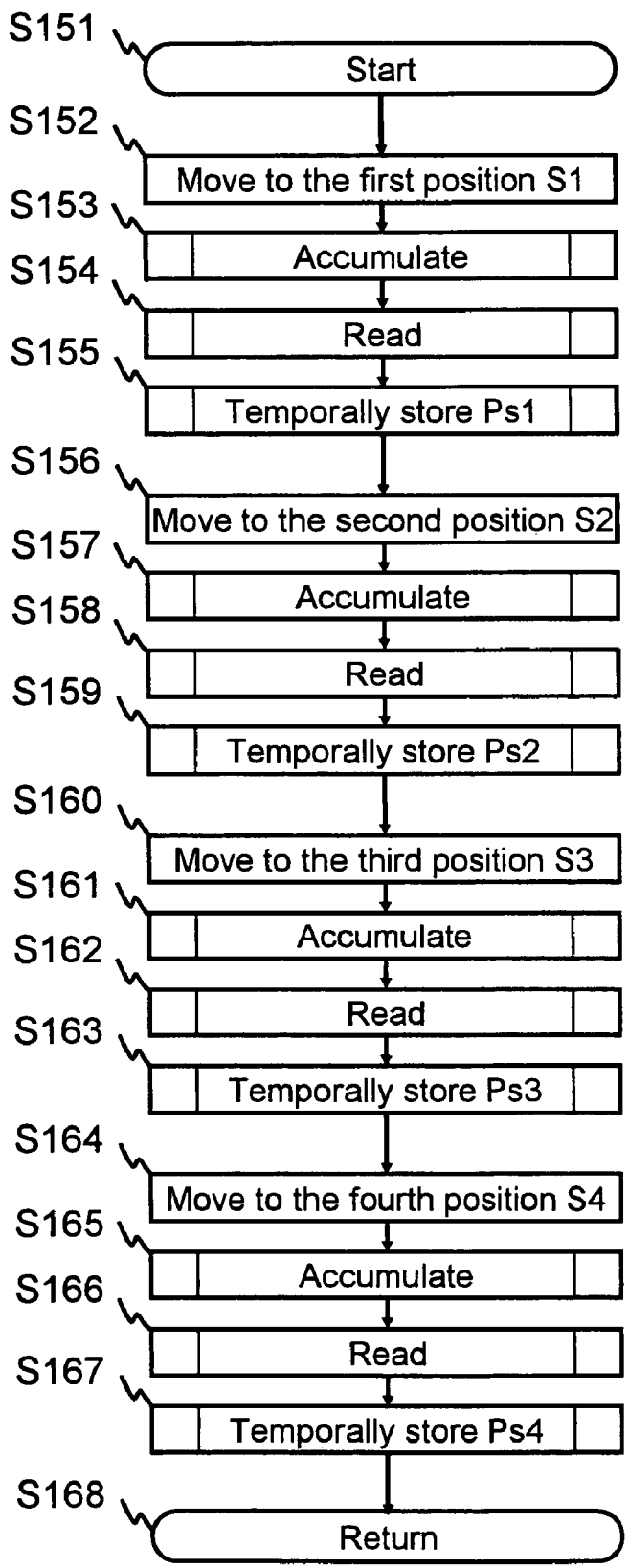
FIG. 17 is a flowchart of the first, second, third, and fourth imaging operations.
Figure 18:
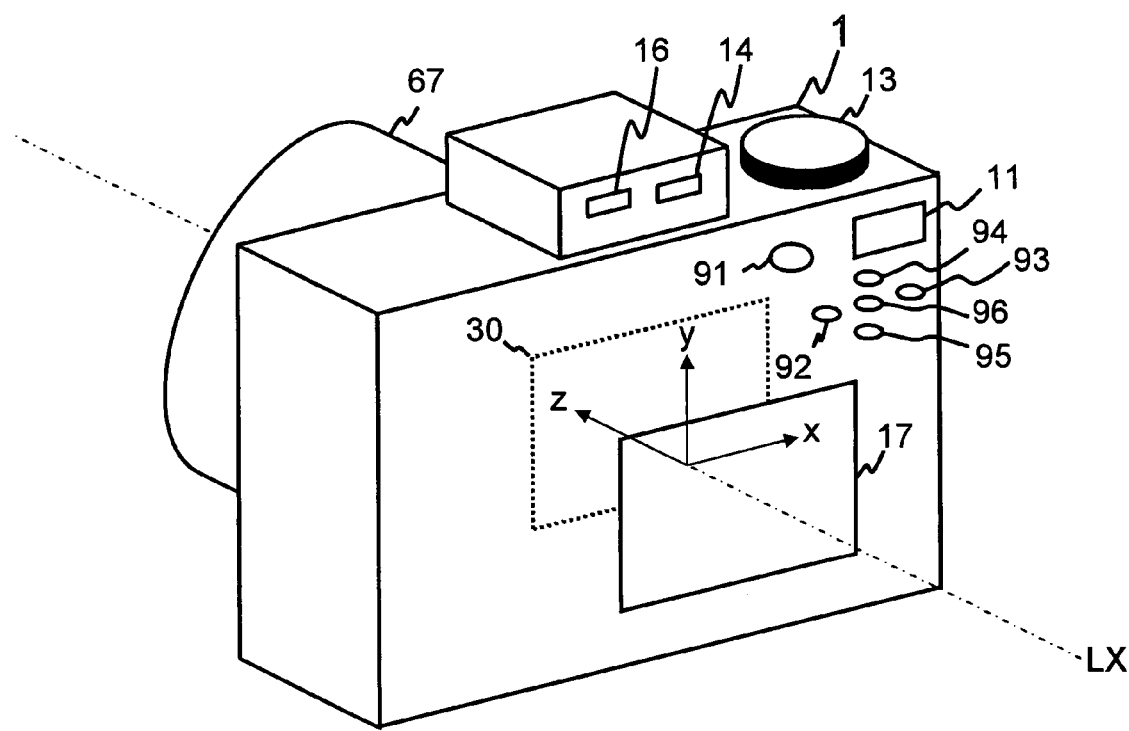
FIG. 18 is a perspective view of a photographing apparatus of the second embodiment viewed from the back side of the photographing apparatus.

Next, the flow of the first, second, third, and fourth imaging operations in step S118 of FIG. 18 is explained by using the flowchart in FIG. 17.

In step S151, the first imaging operation is started.

In step S152, the movable unit 30*a* is moved to the first position S1. In step S153, the electric charge is accumulated in the imaging device 39*a*1. In step S154, the electric charge, which is accumulated in the imaging device 39*a*1, is read. In step S155, the electric signal based on the electric charge, which is read, is converted to the first image signal Ps1, and the first image signal Ps1 is temporally stored in the CPU 21, as the first image Pic1 which is imaged. The first imaging operation is then finished.

After the first imaging operation has finished, the second imaging operation is started.

In step S156, the movable unit 30*a* is moved to the second position S2. In step S157, the electric charge is accumulated in the imaging device 39*a*1. In step S158, the electric charge, which is accumulated in the imaging device 39*a*1, is read. In step S159, the electric signal based on the electric charge, which is read, is converted to the second image signal Ps2, and the second image signal Ps2 is temporally stored in the CPU 21, as the second image Pic2 which is imaged. The second imaging operation is then finished.

After the second imaging operation has finished, the third imaging operation is started.

In step S160, the movable unit 30*a* is moved to the third position S3. In step S161, the electric charge is accumulated in the imaging device 39*a*1. In step S162, the electric charge, which is accumulated in the imaging device 39*a*1, is read. In step S163, the electric signal based on the electric charge, which is read, is converted to the third image signal Ps3, and the third image signal Ps3 is temporally stored in the CPU 21, as the third image Pic3 which is imaged. The third imaging operation is then finished.

After the third imaging operation has finished, the fourth imaging operation is started.

In step S164, the movable unit 30*a* is moved to the fourth position S4. In step S165, the electric charge is accumulated in the imaging device 39*a*1. In step S166, the electric charge, which is accumulated in the imaging device 39*a*1, is read. In step S167, the electric signal based on the electric charge, which is read, is converted to the fourth image signal Ps4, and the fourth image signal Ps4 is temporally stored in the CPU 21, as the fourth image Pic4 which is imaged. The fourth imaging operation is then finished, so that the process is forwarded to step S119 in FIG. 16.

The wide-angle image PicW based on the wide-angle image signal PsW has a wide imaging range in comparison with the first, second, third, and fourth images Pic1, Pic2, Pic3, and Pic4. Accordingly, in the first embodiment, when the wide-angle imaging operation is performed, a wide-angle image in comparison with a focal distance of the photographing optical system 67, can be obtained.

Next, the second embodiment is explained. In the second embodiment, a function in the wide-angle imaging operation is different from that of the first embodiment (see FIG. 21).

Therefore, the second embodiment is explained centering on the constructions (functions) of the photographing apparatus 1 in the second embodiment which are different to the constructions (functions) of the photographing apparatus 1 in the first embodiment.

FIGS. 1, 3, and 18 show the construction of the photographing apparatus 1 in the second embodiment.

The indicating unit 17 indicates the image signal as the photographic subject image. The photographic subject image can be optically observed by the optical finder (not depicted). The indicating unit 17 is connected with the port P6 of the CPU 21.

The memory 18 stores the image signal which is obtained by imaging (the photographic operation) under the condition where the movable unit 30*a* is in the predetermined imaging position. The memory 18 is connected with the port P7 of the CPU 21.

In the second embodiment, there are two types of indicating operations by the indicating unit 17. One of the two types of indicating operations is an indication of the through image, where the photographic subject image based on the image signal is indicated continuously in a first predetermined time interval. The indication of the through image is performed when the release switch 13*a* is in the off state so that the image signal is not stored in the memory 18.

There are two ways of indicating the through image. One of the two ways of indicating the through image is a fourth indication of the normal through image, so that the other of the two ways of indicating the through image is a fifth indication of the wide-angle through image.

In the fourth indication of the normal through image, the normal photographic subject image based on the normal image signal which is obtained by imaging when the movable unit 30*a* is fixed at a predetermined imaging position, is indicated on the indicating field of the indicating unit 17, and the normal image signal is not stored in the memory 18. The fourth indication of the normal through image, is performed when the wide-angle image indication switch 16*a* is in the off state.

In the fifth indication of the wide-angle through image, the wide photographic subject image PicW (the wide-angle image PicW) based on the wide-angle image signal PsW is indicated on the indicating field of the indicating unit 17, and the wide-angle image signal PsW is not stored in the memory 18. The fifth indication of the wide-angle through image, is performed when the wide-angle image indication switch 16a is in the on state.

In the fifth indication in the wide-angle through image, when the anti-shake operation is not performed, a photography frame F1 is further indicated on the indicating field of the indicating unit 17. The photography frame F1 is a boundary which shows an imaging field for storing the memory 18 on the wide-angel image PicW. The position of the photography frame F1 is optionally set by the operator.

Another of the two types of the indicating operation is a sixth indication of the still image obtained by the photographic operation. In the sixth indication of the still image, the photographic subject image (the still image) based on the image signal which is stored in the memory 18, is indicated. The sixth indication of the still image is performed when the release switch 13a is set to the on state so that the image signal is stored in the memory 18.

Figure 19:
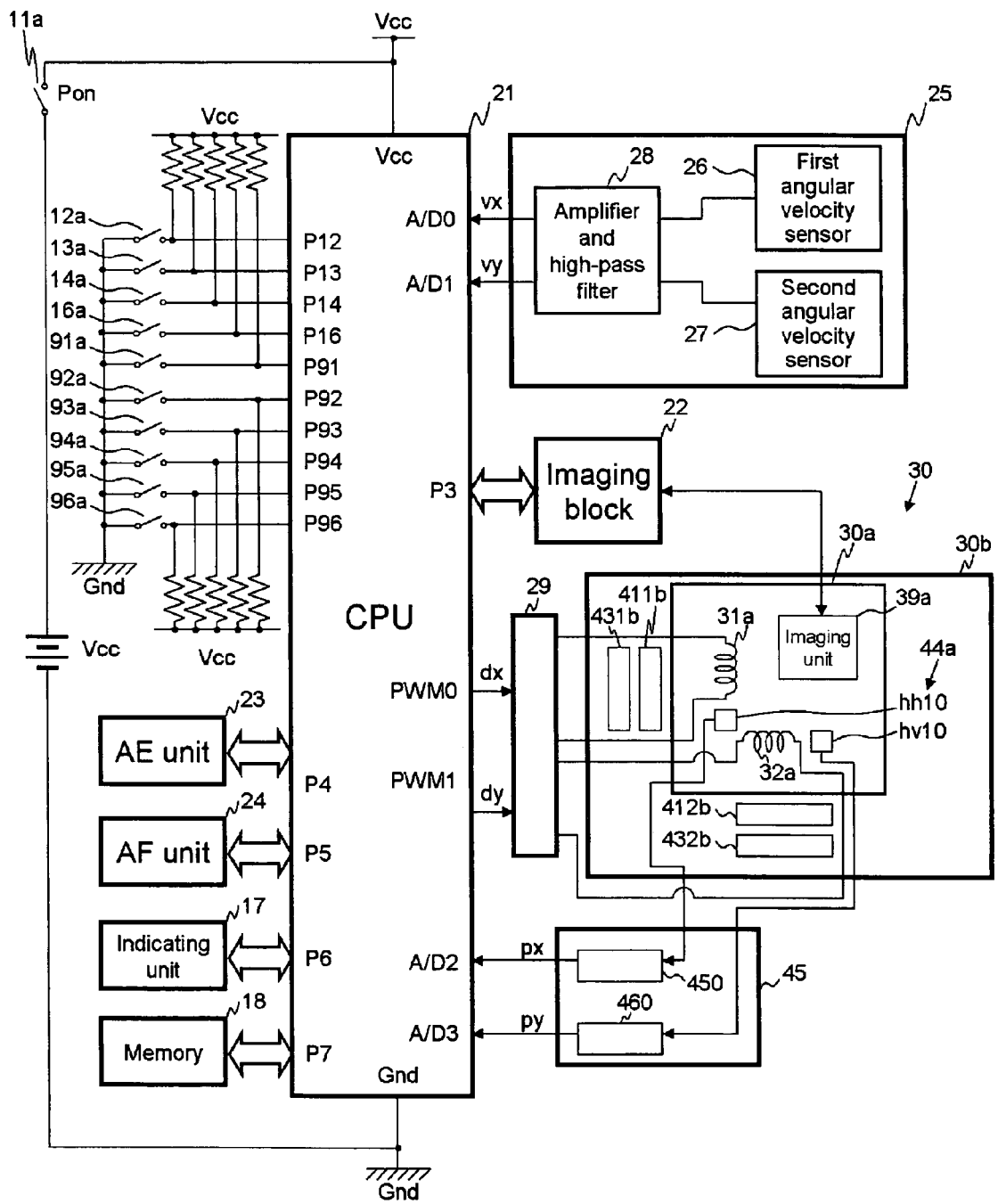
FIG. 19 is a circuit construction diagram of the photographing apparatus in the second embodiment.

FIG. 19 is a block diagram which shows the circuit construction of the photographing apparatus 1.

The CPU 21 is a control apparatus, which controls each part of the photographing apparatus 1 regarding the imaging operation, and controls each part of the photographing apparatus 1 regarding the anti-shake operation including the control of the moving and position-detecting operation. The anti-shake operation controls the movement of the movable unit 30a and controls detecting the position of the movable unit 30a.

The CPU 21 temporarily stores the value of the parameter IS regarding the anti-shake mode, which is described later.

The anti-shaking part of the photographing apparatus 1 comprises an anti-shake button 14, an anti-shake switch 14a, a wide-angle image indication button 16, a wide-angle image indication switch 16a, an indicating unit 17, a CPU 21, an angular velocity detecting unit 25, a driver circuit 29, an anti-shake and wide-angle imaging unit 30, a hall-element signal-processing unit 45, and the photographing optical system 67.

When the anti-shake button 14 is fully pushed by the operator, the anti-shake switch 14a changes to the on state, so that the anti-shake operation is performed (the anti-shake mode) where the angular velocity detecting unit 25 and the anti-shake and wide-angle imaging unit 30 are driven, at every second predetermined time interval, independently of the other operations which include the photometric operation etc. When the anti-shake switch 14a is in the on state, in other words in the anti-shake mode, the parameter IS is set to 1 (IS=1). When the anti-shake switch 14a is not in the on state, in other words in the non anti-shake mode, the parameter IS is set to 0 (IS=0). In this embodiment, the second predetermined time interval is 1 ms.

When the wide-angle image indication button 16 is fully pushed by the operator, the wide-angle image indication switch 16a changes to the on state, and the anti-shake operation is stopped, and the indicating unit 17, the anti-shake and wide-angle imaging unit 30, and the imaging block 22 are driven, and the fifth indication for the wide-angle through image is performed (the wide-angle image indication mode).

The information regarding whether the wide-angle image indication switch 16a is in the on state or in the off state, is input to port P16 of the CPU 21 as a 1-bit digital signal.

The photographing apparatus 1 in the second embodiment has a menu button 91, a menu switch 91a, a first direction key 92, a first direction switch 92a, a second direction key 93, a second direction switch 93a, a third direction key 94, a third direction switch 94a, a fourth direction key 95, a fourth direction switch 95a, a decision button 96, and a decision switch 96a (see FIGS. 18 and 19).

When the menu button 91 is pushed by the operator, the menu switch 91a changes to the on state, so that a menu for selecting the position of the photography frame F1 is indicated.

When the first direction key 92 is pushed by the operator, the first direction switch 92a changes to the on state, the position of the photography frame F1 on the wide-angel image PicW is moved in one direction of the first direction x.

When the second direction key 93 is pushed by the operator, the second direction switch 93a changes to the on state, the position of the photography frame F1 on the wide-angle image PicW is moved in the other direction of the first direction x.

When the third direction key 94 is pushed by the operator, the third direction switch 94a changes to the on state, the position of the photography frame F1 on the wide-angle image PicW is moved in one direction of the second direction y.

When the fourth direction key 95 is pushed by the operator, the fourth direction switch 95a changes to the on state, the position of the photography frame F1 on the wide-angle image PicW is moved in the other direction of the second direction y.

When the decision key 96 is pushed by the operator, the decision switch 96a changes to the on state, and the position of the photography frame F1 on the wide-angle image PicW is determined.

The various output commands corresponding to the input signals of these switches are controlled by the CPU 21.

The information regarding whether the menu switch 91a is in the on state or in the off state, is input to port P91 of the CPU 21 as a 1-bit digital signal. The information regarding whether the first direction switch 92a is in the on state or in the off state, is input to port P92 of the CPU 21 as a 1-bit digital signal. The information regarding whether the second direction switch 93a is in the on state or in the off state, is input to port P93 of the CPU 21 as a 1-bit digital signal. The information regarding whether the third direction switch 94a is in the on state or in the off state, is input to port P94 of the CPU 21 as a 1-bit digital signal. The information regarding whether the fourth direction switch 95a is in the on state or in the off state, is input to port P95 of the CPU 21 as a 1-bit digital signal. The information regarding whether the decision switch 96a is in the on state or in the off state, is input to port P96 of the CPU 21 as a 1-bit digital signal.

The CPU 21 calculates the position S of the imaging unit 39a (the movable unit 30a), which should be moved to, corresponding to the hand-shake quantity which is calculated, for the first direction x and the second direction y, when the photographing apparatus 1 is in the anti-shake mode.

The location in the first direction x of the position S is defined as sx, and the location in the second direction y of the position S is defined as sy. The movement of the movable unit 30a, which includes the imaging unit 39a, is performed by using electro-magnetic force and is described later. The driving force D, which drives the driver circuit 29 in order to move the movable unit 30a to the position S, has a first PWM duty dx as the driving-force component in the first direction x, and a second PWM duty dy as the driving-force component in the second direction y.

The anti-shake and wide-angle imaging unit 30 is an apparatus which corrects the hand-shake effect, by moving a center of the imaging device 39a1 of the imaging unit 39a to the position S, by canceling lag of the photographic subject image on the imaging surface of the imaging device 39a1, and by stabilizing the photographing subject image that reaches the imaging surface of the imaging device 39a1.

The anti-shake and wide-angle imaging unit 30 has a movable unit 30a, which includes the imaging unit 39a, and a fixed unit 30b. Or, the anti-shake and wide-angle imaging unit 30 is composed of a driving part which moves the movable unit 30a by electro-magnetic force to the position S, and a position-detecting part which detects the position of the movable unit 30a (a detected-position P).

The size and the direction of the electro-magnetic force are determined by the size and the direction of the current which flows in the coil, and the size and the direction of the magnetic-field of the magnet.

When the photographing apparatus 1 is in the wide-angle image indication mode, the anti-shake and wide-angle imaging unit 30 obtains a wide-angle image signal PsW which comprises a first image signal Ps1, a second image signal Ps2, a third image signal Ps3, and a fourth image signal Ps4.

The first image signal Ps1 is obtained by the imaging operation under the condition where the movable unit 30a is moved and contacts a first corner edge point pe1 (a first imaging operation).

The second image signal Ps2 is obtained by the imaging operation under the condition where the movable unit 30a is moved and contacts a second corner edge point pe2 (a second imaging operation).

The third image signal Ps3 is obtained by the imaging operation under the condition where the movable unit 30a is moved and contacts a third corner edge point pe3 (a third imaging operation).

The fourth image signal Ps4 is obtained by the imaging operation under the condition where the movable unit 30a is moved and contacts a fourth corner edge point pe4 (a fourth imaging operation).

The movable unit 30a is moved to a point where the movable unit 30a contacts the first corner edge point pe1, or the second corner edge point pe2, or the third corner edge point pe3, or the fourth corner edge point pe4, by the electro-magnetic force generated by the coil and magnet, in the wide-angle image indication mode.

The movable unit 30a is moved to a point in the anti-shake mode, by the electromagnetic force based on the coil and magnet, in the anti-shake mode.

The movable unit 30a is movable in both the first direction x and the second direction y, however the photographing optical system 67 is not movable (fixed). Accordingly, the imaging field IF is moved corresponding to the movement of the movable unit 30a, however the direction of the optical axis LX is not changed.

Because the direction of the optical axis LX is not changed even if the movable unit 30a is moved for obtaining the wide-angle image PicW, the combined image, which is the wide-angle image PicW, does not have a distortion component at the connecting areas (near the overlapping area).

The first corner edge point pe1 is one of the two corner edge points of the movable unit's movement range in the first direction x, and is one of the two corner edge points of the movable unit's movement range in the second direction y. When the movable unit 30a contacts the first corner edge point pe1, the position of the center of the imaging device 39a1 of the movable unit 30a is defined as a first position S1 (see FIG. 4).

The second corner edge point pe2 is another of the two corner edge points of the movable unit's movement range in the first direction x, and is one of the two corner edge points of the movable unit's movement range in the second direction y. When the movable unit 30a contacts the second corner edge point pe2, the position of the center of the imaging device 39a1 of the movable unit 30a is defined as a second position S2 (see FIG. 5).

The third corner edge point pe3 is another of the two corner edge points of the movable unit's movement range in the first direction x, and is another of the two corner edge points of the movable unit's movement range in the second direction y. When the movable unit 30a contacts the third corner edge point pe3, the position of the center of the imaging device 39a1 of the movable unit 30a is defined as a third position S3 (see FIG. 6).

The fourth corner edge point pe4 is one of two corner edge points of the movable unit's movement range in the first direction x, and is another of two corner edge points of the movable unit's movement range in the second direction y. When the movable unit 30a contacts the fourth corner edge point pe4, the position of the center of the imaging device 39a1 of the movable unit 30a is defined as a fourth position S4 (see FIG. 7).

The movable unit's movement range (the movement range of the center of the imaging device 39a1 of the movable unit 30a) is equal to a range which is tied up and surrounded by the first, second, third, and fourth corner edge points pe1, pe2, pe3, and pe4.

When the wide-angle image indication switch 16a is set to the on state so that the fifth indication for the wide-angle through image is performed, and when the movable unit 30a is moved to the first position S1, an image signal which is obtained by the imaging device 39a1 is defined as a first image signal Ps1 (the first imaging operation).

When the wide-angle image indication switch 16a is set to the on state so that the fifth indication for the wide-angle through image is performed, and when the movable unit 30a is moved to the second position S2, an image signal which is obtained by the imaging device 39a1 is defined as a second image signal Ps2 (the second imaging operation) When the wide-angle image indication switch 16a is set to the on state so that the fifth indication for the wide-angle through image is performed, and when the movable unit 30a is moved to the third position S3, an image signal which is obtained by the imaging device 39a1 is defined as a third image signal Ps3 (the third imaging operation).

When the wide-angle image indication switch 16a is set to the on state so that the fifth indication for the wide-angle through image is performed, and when the movable unit 30a is moved to the fourth position S4, an image signal which is obtained by the imaging device 39a1 is defined as a fourth image signal Ps4 (the fourth imaging operation).

It is desirable that the CPU 21 controls the order of movement of the movable unit 30a (the order of the first, second, third, and fourth imaging operation) to be right-handed or left-handed viewed from the third direction z. In the second embodiment, the order of movement of the movable unit 30a is right-handed viewed from the third direction z, that is a first movement is to the first position S1, a second is to the second position S2, a third is to the third position S3, and a fourth is to the fourth position S4.

The driving of the movable unit 30a of the anti-shake and wide-angle imaging unit 30, is performed by the driver circuit 29 which has the first PWM duty dx input from the PWM 0 of the CPU 21 and has the second PWM duty dy input from the PWM 1 of the CPU 21. The detected-position P of the center of the imaging device 39a1 of the movable unit 30a, either before moving or after moving, which is moved by driving the driver circuit 29, is detected by the hall element unit 44a and the hall-element signal-processing unit 45.

Information of a first location in the first direction x for the detected-position P, in other words a first detected-position signal px is input to the A/D converter A/D 2 of the CPU 21. The first detected-position signal px is an analogue signal, and is converted to a digital signal through the A/D converter A/D 2 (A/D converting operation). The first location in the first direction x for the detected-position P, after the A/D converting operation, is defined as pdx, corresponding to the first detected-position signal px.

Information of a second location in the second direction y for the detected-position P, in other words a second detected-position signal py is input to the A/D converter A/D 3 of the CPU 21. The second detected-position signal py is an analogue signal, and is converted to a digital signal through the A/D converter A/D 3 (A/D converting operation). The second location in the second direction y for the detected-position P, after the A/D converting operation, is defined as pdy, corresponding to the second detected-position signal py.

The PID (Proportional Integral Differential) control is performed on the basis of the data for the detected-position P (pdx, pdy) and the data for the position S (sx, sy) which should be moved to.

The values of the first and second PWM duties dx and dy for moving the movable unit 30a to the first, second, third, and fourth positions S1, S2, S3, and S4, are stored in the CPU 21. Accordingly, when the movable unit 30a is moved to the first, second, third, and fourth position S1, S2, S3, and S4, in the wide-angle image indication mode, the PID control may not be performed.

The values of the first and second PWM duties dx and dy for moving the movable unit 30a to the first, second, third, and fourth positions S1, S2, S3, and S4, are set in advance, considering an effect of gravity etc. which is changed by the direction of holding the photographing apparatus 1.

The imaging device has an imaging field IF which has a first length L1 in the first direction x and has a second length L2 in the second direction y.

A second position S2's side area of the imaging field IF when the movable unit 30a is moved to the first position S1, and a first position S1's side area of the imaging field IF when the movable unit 30a is moved to the second position S2, have an overlapping area which has a first width w1 in the first direction x and has the second length L2 in the second direction y (see FIGS. 8 and 9).

A third position S3's side area of the imaging field IF when the movable unit 30a is moved to the second position S2, and a second position S2's side area of the imagine field IF when the movable unit 30a is moved to the third position S3, have an overlapping area which has the first length L1 in the first direction x and has a second width w2 in the second direction y (see FIGS. 9 and 10).

A movement range R1 of the imaging field IF both in the first direction x and the second direction y, is inside a range R2 of an image circle (see FIG. 10). The image circle is equal to an imaging range of the light through the photographing optical system 67, on the imaging surface of the imaging device 39a1.

Accordingly, it is desirable that the first and second widths w1 and w2 are set to be as short as possible under the above condition, in order to perform the wide-angle imaging operation at a wider range (or to obtain the wider wide-angle through image) in comparison with when the first and second widths w1 and w2 are set to be long.

When the fourth indication for the normal through image, and the sixth indication for the still image are performed, the imaging operation is performed under the condition where the movable unit 30a (the center of the imaging device 39a1) is moved to the position S(sx, sy). The value of the position S(sx, sy) is calculated in the anti-shake mode (IS=1). The value of the position S(sx, sy) is set to the predetermined imaging position of the movable unit's movement range which is optionally selected by the operator, in the non anti-shake mode (IS=0).

When the fifth indication for the wide-angle through image is performed, the first imaging operation is performed under the condition where the movable unit 30a is moved to the first position S1, so that the first image signal Ps1 is temporally stored in the CPU 21. The second imaging operation is performed under the condition where the movable unit 30a is moved to the second position S2, so that the second image signal Ps2 is temporally stored in the CPU 21. The third imaging operation is performed under the condition where the movable unit 30a is moved to the third position S3, so that the third image signal Ps3 is temporally stored in the CPU 21. The fourth imaging operation is performed under the condition where the movable unit 30a is moved to the fourth position S4, so that the fourth image signal Ps4 is temporally stored in the CPU 21.

Overlapping areas between a first image Pic1 based on the first image signal Ps1, a second image Pic2 based on the second image signal Ps2, a third image Pic3 based on the third image signal Ps3, and a fourth image Pic4 based on the fourth image signal Ps4, are overlapped, so that the first, second, third, and fourth image signals Ps1, Ps2, Ps3, and Ps4 are connected. And then, the wide-angle image signal PsW is obtained by the combination. An image signal corresponding to the overlapping area is one of the first, second, third, and fourth image signals Ps1, Ps2, Ps3, and Ps4. In other words, in the combination of the first, second, third, and fourth image signals Ps1, Ps2, Ps3, and Ps4, each signal is addressed regarding the overlapping area, and each signal is added regarding the non overlapping area.

A size and a position of the overlapping area between the first, second, third, and fourth images Pic1, Pic2, Pic3, and Pic4, are determined on the basis of the size of the imaging field IF (the lengths of the first and second lengths L1 and L2), and the lengths of the first and second widths w1 and w2. The values of the first and second lengths L1 and L2 and the first and second widths w1 and w2 are determined by the design conditions of the photographing apparatus 1.

The information regarding the size and the position of the overlapping area between the first, second, third, and fourth images Pic1, Pic2, Pic3, and Pic4, is stored in the memory of the CPU 21, as coordinate data. The coordinate data has a first coordinate data D1 and a first edge-point coordinate data T1 for when the movable unit 30a is moved to the first position S1, and has a second coordinate data D2 and a second edge-point coordinate data T2 for when the movable unit 30a is moved to the second position S2, and has a third coordinate data D3 and a third edge-point coordinate data T3 for when the movable unit 30a is moved to the third position S3, and has a fourth coordinate data D4 and a fourth edge-point coordinate data T4 for when the movable unit 30a is moved to the fourth position S4.

When the movable unit 30a is in the first position S1, the first coordinate data D1 and the first edge-point coordinate data T1 are used as the corresponding coordinate information for the imaging device 39a1 (see FIG. 8).

A rectangular area which has a peripheral line being parallel to the first direction x and passing through the first coordinate data D1, a peripheral line being parallel to the second direction y and passing through the first coordinate data D1, a peripheral line being parallel to the first direction x and passing through the first edge-point coordinate data T1, and a peripheral line being parallel to the second direction y and passing through the first edge-point coordinate data T1, shows a field of pixels of the imaging device 39a1 which is used for imaging and that overlap when the movable unit 30a is in the second position S2, or the third position S3, or the fourth position S4.

The first edge-point coordinate data T1 is one of four coordinate data which compose the imaging field IF of the imaging device 39a1.

When the movable unit 30a is in the second position S2, the second coordinate data D2 and the second edge-point coordinate data T2 are used as the corresponding coordinate information for the imaging device 39a1 (see FIG. 9).

A rectangular area which has a peripheral line being parallel to the first direction x and passing through the second coordinate data D2, a peripheral line being parallel to the second direction y and passing through the second coordinate data D2, a peripheral line being parallel to the first direction x and passing through the second edge-point coordinate data T2, and a peripheral line being parallel to the second direction y and passing through the second edge-point coordinate data T2, shows a field of pixels of the imaging device 39a1 which is used for imaging and that overlap when the movable unit 30a is in the first position S1, or the third position S3, or the fourth position S4.

The second edge-point coordinate data T2 is one of four coordinate data which compose the imaging field IF of the imaging device 39a1.

When the movable unit 30a is in the third position S3, the third coordinate data D3 and the third edge-point coordinate data T3 are used as the corresponding coordinate information for the imaging device 39a1 (see FIG. 10).

A rectangular area which has a peripheral line being parallel to the first direction x and passing through the third coordinate data D3, a peripheral line being parallel to the second direction y and passing through the third coordinate data D3, a peripheral line being parallel to the first direction x and passing through the third edge-point coordinate data T3, and a peripheral line being parallel to the second direction y and passing through the third edge-point coordinate data T3, shows a field of pixels of the imaging device 39a1 which is used for imaging and that overlap when the movable unit 30a is in the first position S1, or the second position S2, or the fourth position S4.

The third edge-point coordinate data T3 is one of four coordinate data which compose the imaging field IF of the imaging device 39a1.

When the movable unit 30a is in the fourth position S4, the fourth coordinate data D4 and the fourth edge-point coordinate data T4 are used as the corresponding coordinate information for the imaging device 39a1 (see FIG. 11).

A rectangular area which has a peripheral line being parallel to the first direction x and passing through the fourth coordinate data D4, a peripheral line being parallel to the second direction y and passing through the fourth coordinate data D4, a peripheral line being parallel to the first direction x and passing through the fourth edge-point coordinate data T4, and a peripheral line being parallel to the second direction y and passing through the fourth edge-point coordinate data T4, shows a field of pixels of the imaging device 39a1 which is used for imaging and that overlap when the movable unit 30a is in the first position S1, or the second position S2, or the third position S3.

The fourth edge-point coordinate data T4 is one of four coordinate data which compose the imaging field IF of the imaging device 39a1.

The CPU 21 recognizes the overlapping imaging field based on the first coordinate data D1, the second coordinate data D2, the third coordinate data D3, the fourth coordinate data D4, the first edge-point coordinate data T1, the second edge-point coordinate data T2, the third edge-point coordinate data T3, and the fourth edge-point coordinate data T4, and combines the first, second, third, and fourth image signals Ps1, Ps2, Ps3, and Ps4, for obtaining the wide-angle image signal PsW.

After the first, second, third, and fourth imaging operations, a wide-angle image PicW based on the wide-angle image signal PsW is indicated on the indicating field of the indicating unit 17. The wide-angle image signal PsW is not stored in the memory 18.

Until the release switch 13a is set to the on state, the fifth indication for the wide-angle through image is repeatedly performed at every first predetermined time interval, in other words the movement of the movable unit 30a to the first, second, third, and fourth positions S1, S2, S3, and S4, the imaging at the first, second, third, and fourth positions S1, S2, S3, S4, the combination of the first, second, third, and fourth image signals Ps1, Ps2, Ps3, and Ps4 for obtaining the wide-angle image signal PsW, and the indication of the wide-angle image PicW are repeatedly performed at every first predetermined time interval.

Accordingly, the indication of the still image is renewed and continuously performed at every first predetermined time interval, so that the operator can observe the moving picture based on the continuously indicated still images.

The predetermined imaging position is a position which is optionally selected in the movement range of the movable unit 30a by the operator, for specifying the area to be stored in the memory 18. The photography frame F1, which is indicated on the indicating unit 17, is moved by the operator using the menu button 91, the first, second, third, and fourth direction keys 92, 93, 94, and 95, and the decision key 96, so that the area to be stored in the memory 18 is selected in the range of the wide-angle image PicW.

The photography frame F1 is indicated when the indicating unit 17 indicates the wide-angle through image (the fifth indication is performed), and when the photographing apparatus is in the non anti-shake mode (IS=0).

The photography frame F1 is set to a position of an imaging field when the imaging device 39a1 is in the center of its movement range both in the first direction x and the second direction y, in an initial state.

The CPU 21 recognizes a movement quantity from the initial position, so that the predetermined imaging position of the movable unit 30a is set to a position corresponding to the movement quantity from the initial position.

Accordingly, the photography frame F1 on the indicating unit 17, agrees with the imaging field of the imaging device 39a1 when the movable unit 30a is in the predetermined imaging position.

The other constructions in the second embodiment are the same as those in the first embodiment.

Figure 20:
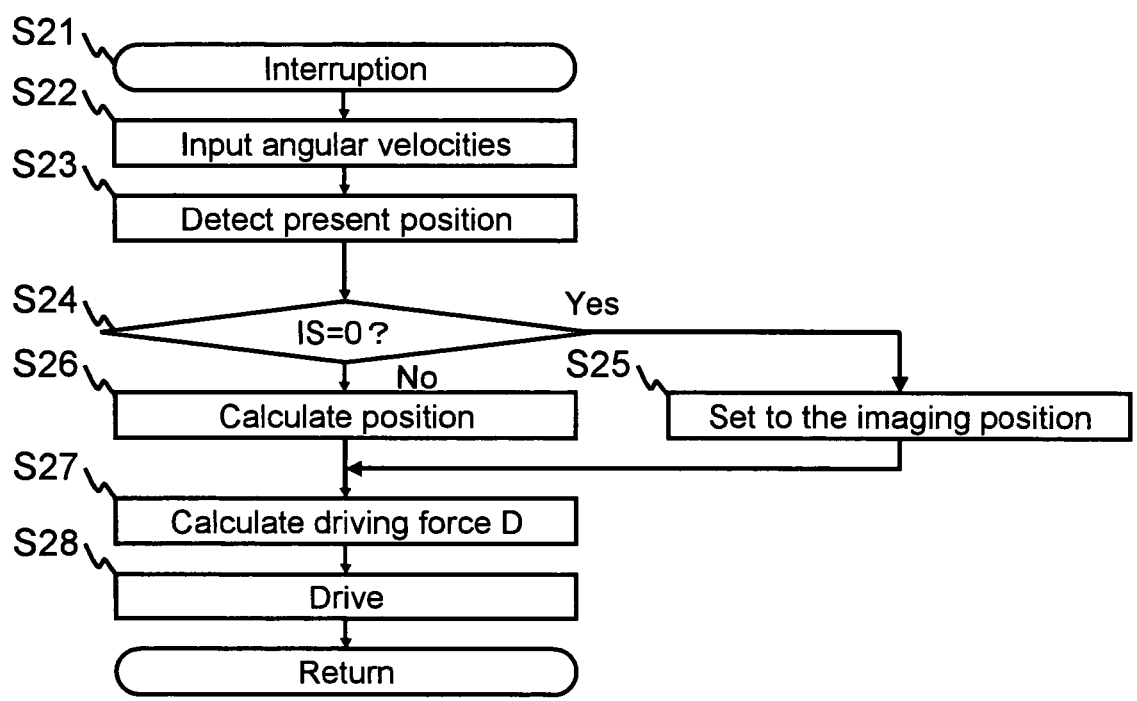
FIG. 20 is a flowchart of the anti-shake operation, which is performed at every second predetermined time interval, as an interruption process, in the second embodiment.

Next, the flow of the anti-shake operation, which is performed at every second predetermined time interval (1 ms) as an interruption process, independently of the other operations, is explained by using the flowchart in FIG. 20.

In step S21, the interruption process for the anti-shake operation is started. In step S22, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S23, the position of the movable unit 30a is detected by the hall element unit 44a, so that the first detected-position signal px, which is calculated by the hall-element signal-processing unit 45, is input to the A/D converter A/D 2 of the CPU 21 and is converted to a digital signal (pdx), and the second detected-position signal py, which is calculated by the hall-element signal-processing unit 45, is input to the A/D converter A/D 3 of the CPU 21 and is converted to a digital signal (pdy). Therefore, the present position of the movable unit 30a P (pdx, pdy) is determined.

In step S24, it is judged whether the value of the IS is 0. When it is judged that the value of the IS is 0 (IS=0), in other words in the non anti-shake mode, the position S (sx, sy) of the movable unit 30a (the imaging unit 39a), which should be moved to, is set to the predetermined imaging position of the movement range of the movable unit 30a, in step S25. When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S26.

In step S27, the driving force D, which drives the driver circuit 29 in order to move the movable unit 30a to the position S, in other words the first PWM duty dx and the second PWM duty dy, is calculated on the basis of the position S (sx, sy), which is determined in step S25 or step S26, and the present position P (pdx, pdy).

In step S28, the first coil unit 31a is driven by using the first PWM duty dx through the driver circuit 29, and the second coil unit 32a is driven by using the second PWM duty dy through the driver circuit 29, so that the movable unit 30a is moved.

The process in steps S27 and S28 is an automatic control calculation, which is used with the PID automatic control for performing general (normal) proportional, integral, and differential calculations.

Figure 21:
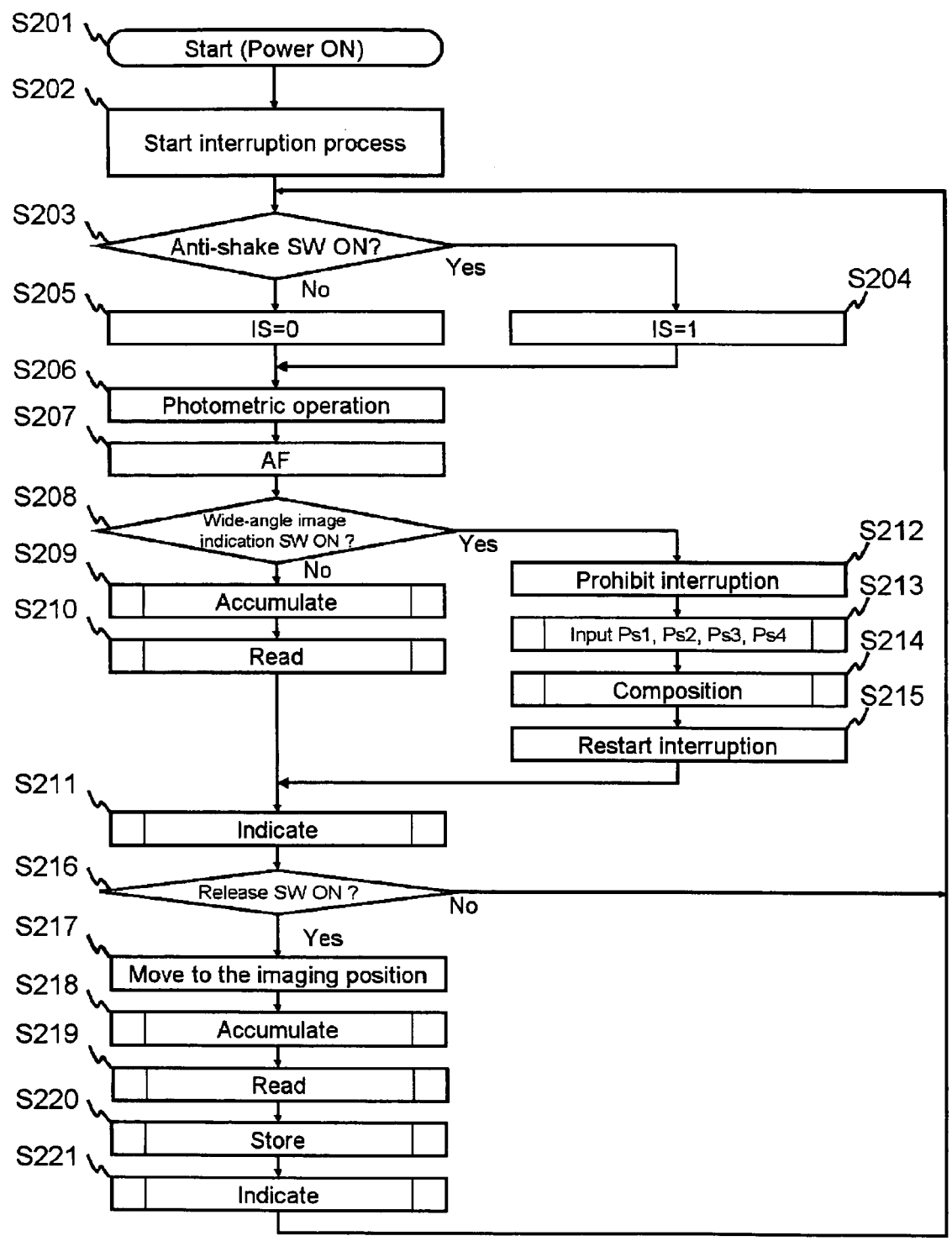
FIG. 21 is a flowchart of the imaging operation in the second embodiment.

Next, the flow of the imaging operation (the flow of the operation of the CPU 21) is explained by using the flowchart in FIG. 21.

In step S201, the Pon switch 11a is set to the on state (power on), so that the power of the photographing apparatus 1 is set to the on state. In step S202, the anti-shake operation, which is described by using the flowchart in FIG. 20, is started at every second predetermined time interval (1 ms) as an interruption process. The anti-shake operation is performed independently of the other operations after step S202.

In step S203, it is judged whether the anti-shake switch 14a is in the on state. When the anti-shake switch 14a is in the on state, the value of the parameter IS is set to 1 in step S204. When the anti-shake switch 14a is in the off state, the value of the parameter IS is set to 0 in step S205.

In step S206, the photometric operation is performed by driving an AE sensor of the AE unit 23, so that the aperture value and the time length of the exposure time are calculated. In step S207, the AF sensing operation is performed by driving an AF sensor of the AF unit 24, so that the focusing operation is performed by driving a lens control circuit of the AF unit 24.

In step S208, it is judged whether the wide-angle image indication switch 16a is set to the on state. When it is judged that the wide-angle image indication switch 16a is not set to the on state, the fourth indication for the normal through image is performed. Specifically, in step S209, the electric charge is accumulated in the imaging device 39a1. In step S210, the electric charge, which is accumulated in the imaging device 39a1 in the exposure time, is read.

In step S211 after step S210, the electric signal on the basis of the electric charge which is read, is converted to the image signal, so that the normal image on the basis of the image signal, on the basis of the electric charge which is read, is indicated on the indicating field of the indicating unit 17.

When it is judged that the wide-angle image indication switch 16a is set to the on state, the fifth indication for the wide-angle through image is performed. Specifically, in step S212, the anti-shake operation as an interruption process is stopped (prohibited). In step S213, the first image signal Ps1 is input to and temporally stored in the CPU 21 (the first imaging operation), the second image signal Ps2 is input to and temporally stored in the CPU 21 (the second imaging operation), the third image signal Ps3 is input to and temporally stored in the CPU 21 (the third imaging operation), and the fourth image signal Ps4 is input to and temporally stored in the CPU 21 (the fourth imaging operation).

In step S214, the first, second, third, and fourth image signals Ps1, Ps2, Ps3, and Ps4 are combined as the wide-angle image signal PsW. This combined includes a making operation for the data of the thinning operation or the compressing operation.

In step S215, the prohibition state of the interruption is released, the anti-shake operation is re-started, so that the process is forwarded to step S211.

In step S211 after step S215, the wide-angle image PicW based on the wide-angle image signal PsW is indicated on the indicating field of the indicating unit 17. In the case that the photographing apparatus 1 is in the non anti-shake mode (IS=0), the photography frame F1 is indicated where the photography frame F1 is layered on the wide-angle image PicW and at the predetermined imaging position. In the case that the photographing apparatus 1 is in the anti-shake mode (IS=1), the photography frame F1 is not indicated.

In step S216, it is judged whether the release switch 13a is set to the on state by the operator. When the release switch 13a is not set to the on state, the process is returned to step S203, so that the imaging operation is repeated. When the release switch 13a is set to the on state, the position S of the movable unit 30a is set to the predetermined imaging position, so that the movable unit 30a is moved to the predetermined imaging position, in step S217. And then the imaging field IF of the imaging device 39a1 agrees with the photography frame F1.

In step S218, the electric charge is accumulated in the imaging device 39a1. In step S219, the electric charge, which is accumulated in the imaging device 39a1, is read. In step S220, the electric signal based on the electric charge, which is read, is converted to the image signal, and the image signal is stored in the memory 18 in the photographing apparatus 1, as an image which has been imaged. In step S221 the image which has been stored, is indicated on the indicating field of the indicating unit 17, in other words the sixth indication for the still image is performed. In the sixth indication, the wide-angle image PicW is not indicated, even if the wide-angle image indication switch 16a is in the on state or the off state, and even if the anti-shake switch 14a is in the on state or the off state. The process is returned to step S203.

The flow of the first, second, third, and fourth imaging operations in step S213 of FIG. 21 in the second embodiment, is similar to that in step S118 of FIG. 18 in the first embodiment.

Figure 22:
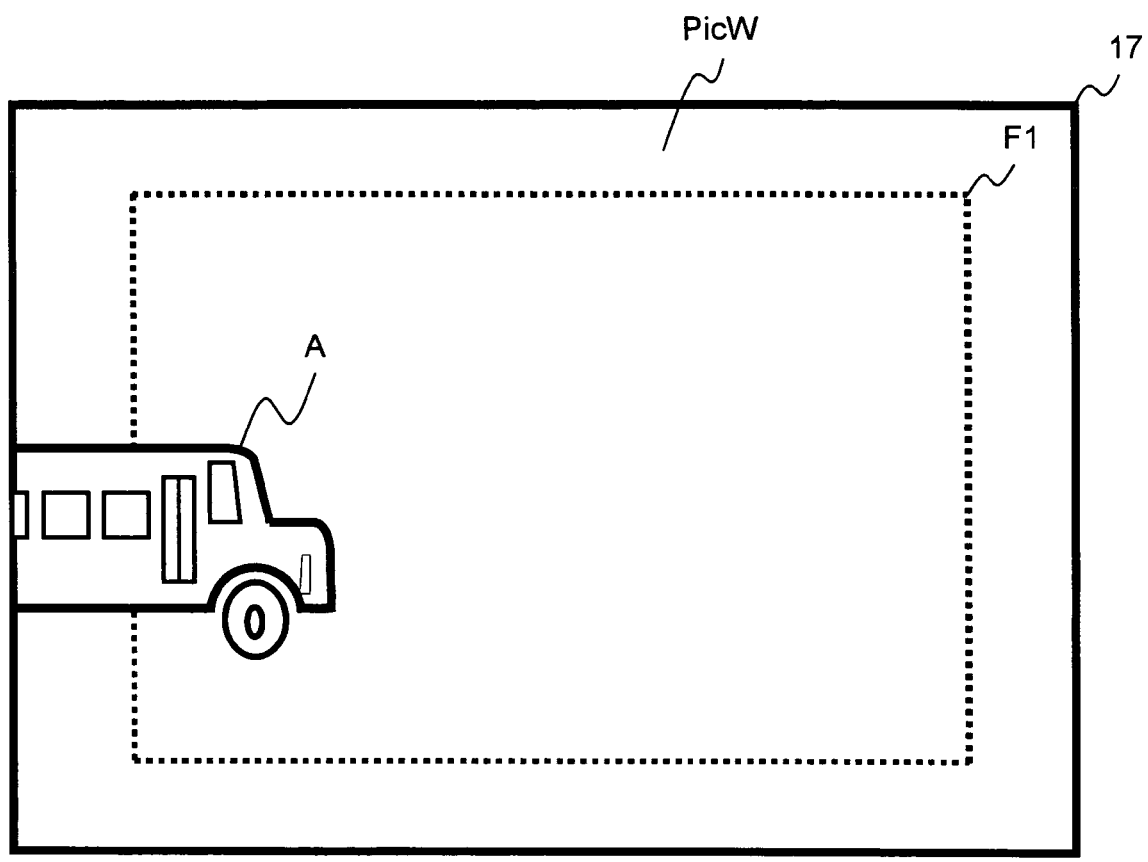
FIG. 22 shows the wide-angle through image and the photography frame which is in the center of its movement range.

The wide-angle image PicW based on the wide-angle image signal PsW has a wide imaging range in comparison with the first, second, third, and fourth images Pic1, Pic2, Pic3, and Pic4. Accordingly, in the second embodiment, when the wide-angle imaging operation is performed, a wide-angle image in comparison with a standard image obtained by using the focal distance of the photographing optical system 67, can be obtained. Further, when the anti-shake operation is not performed (non anti-shake mode), the photography frame F1 is indicated on the indicating unit 17, in addition to the through image based on the wide-angle image PicW (see FIG. 22).

Accordingly, the operator can confirm the situation for not only inside the photography frame F1 but also outside the photography frame F1, by observing the indicating unit 17. Therefore, a moving situation of a photographing subject A which is moving from outside of the photography frame F1 to inside the photography frame F1, can be confirmed before the photographing subject A has reached inside the photography frame F1. So, a photographing subject which is moving such as the photographing subject A, can be imaged without missing the opportunity of the imaging operation.

Figure 23:
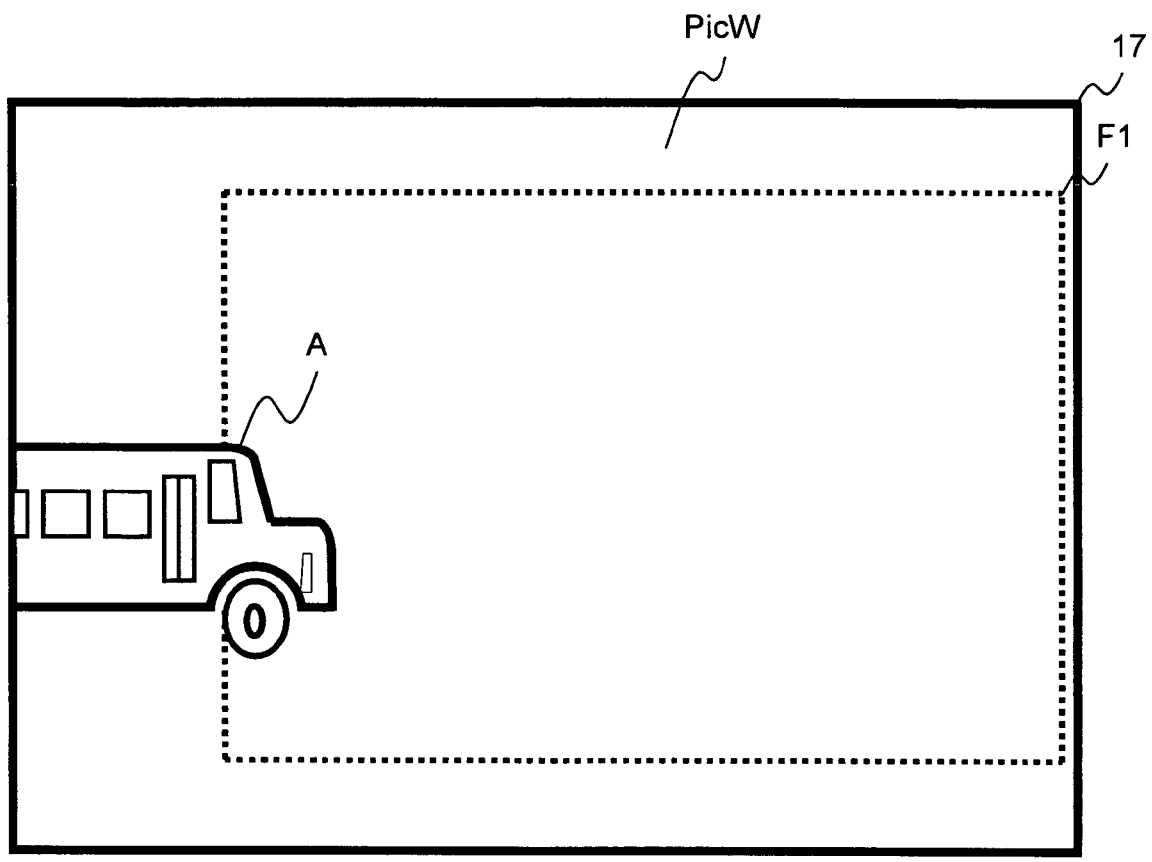
FIG. 23 shows the wide-angle through image and the photography frame which is moved from the center.

In the second embodiment, the photography frame F1 corresponding to the predetermined imaging position, also can be optionally selected by the operator, so that the photographing subject which is moving such as the photographing subject A, further can be imaged without missing the opportunity of the imaging operation, by moving the photography frame F1. Specifically, when the photographing subject A is moving from outside the photography frame F1 to inside the photography frame F1, the photography frame F1 is moved in the moving direction of the photographing subject A, away from A (see FIG. 23). It becomes possible to lengthen a time difference between a time when the photographing subject A has reached inside the wide-angle image PicW, and a time when the photographing subject A has reached inside the photography frame F1, so that a time until the photographing subject A has reached inside the photographing frame F1, can be lengthened.

In the case that the moving direction of the photographing subject A is not obvious, the photographing frame F1 corresponding to the predetermined imaging position, is set to the center of the movable unit's movement range and of the movement range of the imaging field IF of the imaging device 39a1.

In the first and second embodiments, the members which are used for obtain the wide-angle image signal PsW, are used for the anti-shake operation. Accordingly, in the case that the photographing apparatus has the anti-shake apparatus, the wide-angle imaging operation can be performed without adding exclusive members.

Further, it is explained that the first position S1 is a position where the movable unit 30a contacts the first corner edge point pe1. In this case, the movable unit 30a is driven by the driving force D to where the movable unit 30a contacts the first corner edge point pe1, so that the movable unit 30a can reach the first position S1. The value of this driving force D can be determined in advance, considering an effect of gravity and the characteristics of each member etc. and changes according to the way the photographing apparatus 1 is held. Accordingly, the process for calculating the driving force D for moving to the first position S1, and the process for detecting the first position S1 to be moved to, can be omitted. This is similar for those of the second, third, and fourth positions S2, S3, and S4.

In the first and second embodiments, it is explained that the movable unit 30a is moved to the four positions (the first, second, third, and fourth positions S1, S2, S3, and S4), in order to obtain the wide-angle image PicW. However, if a number of positions where the movable unit 30a is moved to, is two or more, the wide-angle image PicW can be obtained on the basis of the image signals based on these two positions of the movable unit 30a.

In the first and second embodiments, the first magnet 411b is one body in order to detect the first location in the first direction x of the movable unit 30a, and drive the movable unit 30a in the first direction x. However a magnet for detecting the first location and a magnet for driving the movable unit 30a in the first direction x, may be separated.

Similarly, the second magnet 412b is one body in order to detect the second location in the second direction y of the movable unit 30a, and drive the movable unit 30a in the second direction y. However a magnet for detecting the second location and a magnet for driving the movable unit 30a in the second direction y, may be separated.

Further, it is explained that the hall element unit 44a is attached to the movable unit 30a and the position-detecting magnets (the first and second magnets 411b and 412b) are attached to the fixed unit 30b, however the hall element unit may be attached to the fixed unit and position-detecting magnets may be attached to the movable unit.

The magnet which generates a magnetic-field, may be a permanent magnet which always generates the magnetic-field, or an electric magnet which generates the magnetic-field when it is needed.

Further, moving the movable unit 30a is not limited by the electromotive force by the coil and the magnet.

Further, it is explained that the hall element is used for position-detecting as the magnetic-field change-detecting element, however, another detecting element may be used for position-detecting. Specifically, the detecting element may be an MI (Magnetic Impedance) sensor, in other words a high-frequency carrier-type magnetic-field sensor, or a magnetic resonance-type magnetic-field detecting element, or an MR (Magneto-Resistance effect) element. When one of the MI sensor, the magnetic resonance-type magnetic-field detecting element, and the MR element is used, the information regarding the position of the movable unit can be obtained by detecting the magnetic-field change, similar to using the hall element.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications Nos. 2004-185207 (filed on Jun. 23, 2004) and 2004-185371 (filed on Jun. 23, 2004), which are expressly incorporated herein by references, in their entirety.

The invention claimed is:

1. A photographing apparatus, comprising:
   a movable unit that has an imaging device, and that is movable in a first direction, said first direction being perpendicular to an optical axis of a photographing optical system of said photographing apparatus;
   a fixed unit that slidably supports said movable unit for movement in said first direction; and
   a control apparatus that controls movement of said movable unit to two or more movement-positions in a movement range of said movable unit, and that obtains a wide-angle image signal which is a combination of two or more image signals being imaged at said two or more movement-positions of said movable unit,
   wherein a movement range of an imaging field of said imaging device of said movable unit is within an image circle which is equal to an imaging range of light passing through said photographing optical system.

2. The photographing apparatus according to claim 1, wherein said movable unit is movable in said first direction and in a second direction which is perpendicular to said first direction and to said optical axis;
   said fixed unit slidably supports said movable unit for movement in both said first and said second directions; and
   a number of said movement positions is four or more.

3. The photographing apparatus according to claim 2, wherein said four or more movement positions are first, second, third, and fourth positions;
   said first position is where said movable unit contacts a first corner edge point which is an intersection of two edges of the movement range of said movable unit in said first direction, and is one of two edges of the movement range of said movable unit in said second direction;
   said second position is where said movable unit contacts a second corner edge point which is another intersection of two edges of the movement range of said movable unit in said first direction, and is one of two edges of the movement range of said movable unit in said second direction;
   said third position is where said movable unit contacts a third corner edge point which is an intersection of two edges of the movement range of said movable unit in said first direction, and is one of two edges of the movement range of said movable unit in said second direction; and
   said fourth position is where said movable unit contacts a fourth corner edge point which is an intersection of two edges of the movement range of said movable unit in said first direction, and is one of two edges of the movement range of said movable unit in said second direction.

4. The photographing apparatus according to claim 3, wherein an order of the movement of said movable unit to said first, second, third, and fourth positions is clockwise or counterclockwise when viewed from a third direction which is parallel to said optical axis.

5. The photographing apparatus according to claim 2, wherein one of said movable unit and said fixed unit has a first coil which is configured to move said movable unit in said first direction, and has a second coil which is configured to move said movable unit in said second direction; and
   another of said movable unit and said fixed unit has a first magnet which is configured to move said movable unit in said first direction, and has a second magnet which is configured to move said movable unit in said second direction.

6. The photographing apparatus according to claim 1, wherein said imaging device can read out part of the accumulated electric charge; and
   each of said two or more image signals is obtained on a basis of the accumulated electric charge which is read out for the part of the imaging field which is needed for the combination.

7. The photographing apparatus according to claim 1, further comprising an indicating unit that indicates a wide-angle image based on said wide-angle image signal.

8. The photographing apparatus according to claim 7, wherein said movable unit is movable in said first direction and in a second direction which is perpendicular to said first direction and to said optical axis;
   said fixed unit slidably supports said movable unit for movement in both said first and said second directions; and
   a number of said movement positions is four or more.

9. The photographing apparatus according to claim 8, wherein said four or more movement positions are first, second, third, and fourth positions;
   said first position is where said movable unit contacts a first corner edge point which is an intersection of two edges of the movement range of said movable unit in said first direction, and is one of two edges of the movement range of said movable unit in said second direction;
   said second position is where said movable unit contacts a second corner edge point which is another intersection of two edges of the movement range of said movable unit in said first direction, and is one of two edges of the movement range of said movable unit in said second direction;
   said third position is where said movable unit contacts a third corner edge point which is an intersection of two edges of the movement range of said movable unit in said first direction, and is one of two edges of the movement range of said movable unit in said second direction; and
   said fourth position is where said movable unit contacts a fourth corner edge point which is an intersection of two edges of the movement range of said movable unit in said first direction, and is one of two edges of the movement range of said movable unit in said second direction.

10. The photographing apparatus according to claim 9, further comprising a memory that stores an image signal;
    said control unit moving said movable unit to a predetermined imaging position; and
    said image signal being obtained by imaging when said movable unit is in said predetermined imaging position.

11. The photographing apparatus according to claim 10, wherein said indicating unit indicates a photography frame which shows an imaging field for storing said image signal in said memory on said wide-angle image when said movable unit is in said predetermined imaging position.

12. The photographing apparatus according to claim 11, wherein said predetermined imaging position coincides with a center of a movement range of said movable unit and of with the movement range of an imaging field of said imaging device.

13. The photographing apparatus according to claim 11, further comprising an operating unit;
    said predetermined imaging position is optionally selected, within the movement range of said movable unit, by use of said operating unit.

14. The photographing apparatus according to claim 13, wherein said operating unit has direction keys which are configured to select said predetermined imaging position.

* * * * *